United States Patent
Kim et al.

(10) Patent No.: US 12,513,767 B2
(45) Date of Patent: *Dec. 30, 2025

(54) PERFORMING CELL SELECTION PROCEDURE BASED ON SUPPLEMENTARY UPLINK (SUL) TECHNOLOGY

(71) Applicant: Samsung Electronics Co., Ltd., Suwon-si (KR)

(72) Inventors: Dong gun Kim, Suwon-si (KR); Sang Bum Kim, Suwon-si (KR); Soeng Hun Kim, Suwon-si (KR); Alexander Sayenko, Suwon-si (KR); Jae Hyuk Jang, Suwon-si (KR); Seung Ri Jin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/528,601

(22) Filed: Dec. 4, 2023

(65) Prior Publication Data

US 2024/0107609 A1    Mar. 28, 2024

Related U.S. Application Data

(60) Continuation of application No. 17/306,823, filed on May 3, 2021, now Pat. No. 11,838,976, which is a
(Continued)

(30) Foreign Application Priority Data

Nov. 9, 2017    (KR) ........................ 10-2017-0148448
Nov. 16, 2017    (KR) ........................ 10-2017-0153117

(51) Int. Cl.
*H04W 76/19*    (2018.01)
*H04W 74/0833*    (2024.01)
(Continued)

(52) U.S. Cl.
CPC .......... *H04W 76/19* (2018.02); *H04W 76/30* (2018.02); *H04W 74/0833* (2013.01); *H04W 80/02* (2013.01); *H04W 88/02* (2013.01)

(58) Field of Classification Search
CPC . H04W 76/19; H04W 36/0033; H04W 76/30; H04W 80/02; H04W 88/02;
(Continued)

(56) References Cited

U.S. PATENT DOCUMENTS

2009/0046659 A1    2/2009 Sebire et al.
2013/0194981 A1    8/2013 Wang et al.
(Continued)

FOREIGN PATENT DOCUMENTS

CN    101616443 A    12/2009
KR    10-2017-0106988 A    9/2017

OTHER PUBLICATIONS

Office Action issued Dec. 14, 2023, in connection with Chinese Patent Application No. 201880072718.8, 15 pages.
(Continued)

*Primary Examiner* — Brian T Le

(57) ABSTRACT

A method, performed by a user equipment (UE), of transmitting and receiving signals in a wireless communication system, according to an embodiment, includes receiving a logical channel release request from a next-generation node B (gNB), determining a logical channel to release, an operation mode of the logical channel to release, and whether a packet data convergence protocol (PDCP) layer apparatus connected to the logical channel is re-established, based on the logical channel release request, and performing PDCP data recovery based on the determination result.

10 Claims, 27 Drawing Sheets

Related U.S. Application Data division of application No. 16/186,185, filed on Nov. 9, 2018, now abandoned.

(51) Int. Cl.
*H04W 76/30* (2018.01)
*H04W 80/02* (2009.01)
*H04W 88/02* (2009.01)

(58) Field of Classification Search
CPC ........ H04W 76/10; G06F 1/1626; H04B 1/38; H04M 1/00

See application file for complete search history.

(56) References Cited

U.S. PATENT DOCUMENTS

| | | |
|---|---|---|
| 2014/0204918 A1 | 7/2014 | Ha et al. |
| 2016/0205660 A1 | 7/2016 | Ryu et al. |
| 2017/0070931 A1 | 3/2017 | Huang et al. |
| 2018/0049234 A1 | 2/2018 | Lee et al. |
| 2018/0248616 A1 | 8/2018 | Tiirola |
| 2021/0022176 A1* | 1/2021 | Yang ..................... H04L 5/0098 |

OTHER PUBLICATIONS

Notice Of Allowance issued Feb. 22, 2024, in connection with European Patent Application No. 18876060.7, 90 pages.
CMCC, "Discussion on SUL and UL sharing band definition", 3GPP TSG-RAN WG4 Meeting NR#2, May 27-29, 2017, R4-1706706, 6 pages.
Huawei, HiSilicon, "Initial access and uplink operations with Sul", 3GPP TSG RAN WG1 Meeting #90, Aug. 21-25, 2017, R1-1712165, 6 pages.
Samsung, "PUCCH and PUSCH on SUL", 3GPP TSG-RAN WG2 Meeting #99bis, Oct. 9-13, 2017, R2-1711632, 3 pages.
Samsung, "Initial access for supplementary uplink frequency", 3GPP TSG-RAN WG2 #99bis, Oct. 9-13, 2017, R2-1711807, 4 pages.
CMCC, "Considerations on support of supplementary uplink frequency", 3GPP TSG-RAN WG2 Meeting #99bis, Oct. 9-13, 2017, R2-1711824, 6 pages.
Huawei, HiSilicon, "Discussion on RRM impact on uplink sharing", 3GPP TSG-RAN WG4 Meeting #84bis, Oct. 9-13, 2017, R4-1711227, 6 pages.
Supplementary European Search Report dated Nov. 3, 2020 in connection with European Patent Application No. 18 87 6060, 11 pages.
ISA/KR, "International Search Report and Written Opinion of the International Searching Authority," Application No. PCT/KR2018-013612, Feb. 25, 2019, 9 pages.
Intel Corporation, "RRC signaling for SN release," R2-1710616, 3GPP TSG-RAN WG2 Meeting 99bis, Prague, Czech Republic, Oct. 9-13, 2017, 6 pages.
3GPP TS 36.323 V14.4.0 (Sep. 2017), Technical Specification, 3rd Generation Partnership Project; Technical Specification Group Radio Access Network; Evolved Universal Terrestrial Radio Access (E-UTRA); Packet Data Convergence Protocol (PDCP) specification (Release 14), Sep. 2017, 44 pages.
3GPP TS 36.331 V14.4.0 (Sep. 2017), Technical Specification, 3rd Generation Partnership Project; Technical Specification Group Radio Access Network; Evolved Universal Terrestrial Radio Access (E-UTRA); Radio Resource Control (RRC); Protocol specification (Release 14), Sep. 2017, 754 pages.
3GPP TS 38.323 V1.0.0 (Sep. 2017), Technical Specification, 3rd Generation Partnership Project; Technical Specification Group Radio Access Network; NR; Packet Data Convergence Protocol (PDCP) specification (Release 15), Sep. 2017, 30 pages.
Korean Intellectual Property Office, Office Action, issued Jun. 22, 2022, in connection with Korean Patent Application No. 10-2017-0153117, 7 pages.
European Patent Office, "Communication pursuant to Article 94(3) EPC," issued May 6, 2022, in connection with European Patent Application No. 18876060.7, 8 pages.
Communication pursuant to Article 94(3) EPC dated Oct. 25, 2022 in connection with European Patent Application No. 18 876 060.7, 7 pages.
Office Action dated Dec. 26, 2022 in connection with Korean Patent Application No. 10-2017-0153117, 8 pages.
Komine et al., "A Proposal of Cell Selection Algorithm for LTE Handover Optimization", IEEE, Dec. 31, 2012, 6 pages.
The First Office Action issued Mar. 4, 2023, in connection with Chinese Patent Application No. 201880072718.8, 42 pages.
Communication pursuant to Article 94(3) EPC issued Apr. 24, 2023, in connection with European Patent Application No. 18876060.7, 6 pages.
Notice of Allowance dated Jul. 26, 2023, in connection with Korean Patent Application No. 10-2017-0153117, 7 pages.
Samsung, "Introducing support for NR", R2-1711505, 3GPP TSG-RAN WG2 Meeting #99 bis, Prague, Czech Republic, Oct. 9-13, 2017, 361 pages.
Communication under Rule 71(3) EPC dated Jul. 11, 2024, in connection with European Patent Application No. 18876060.7, 91 pages.

\* cited by examiner (a)

(b)

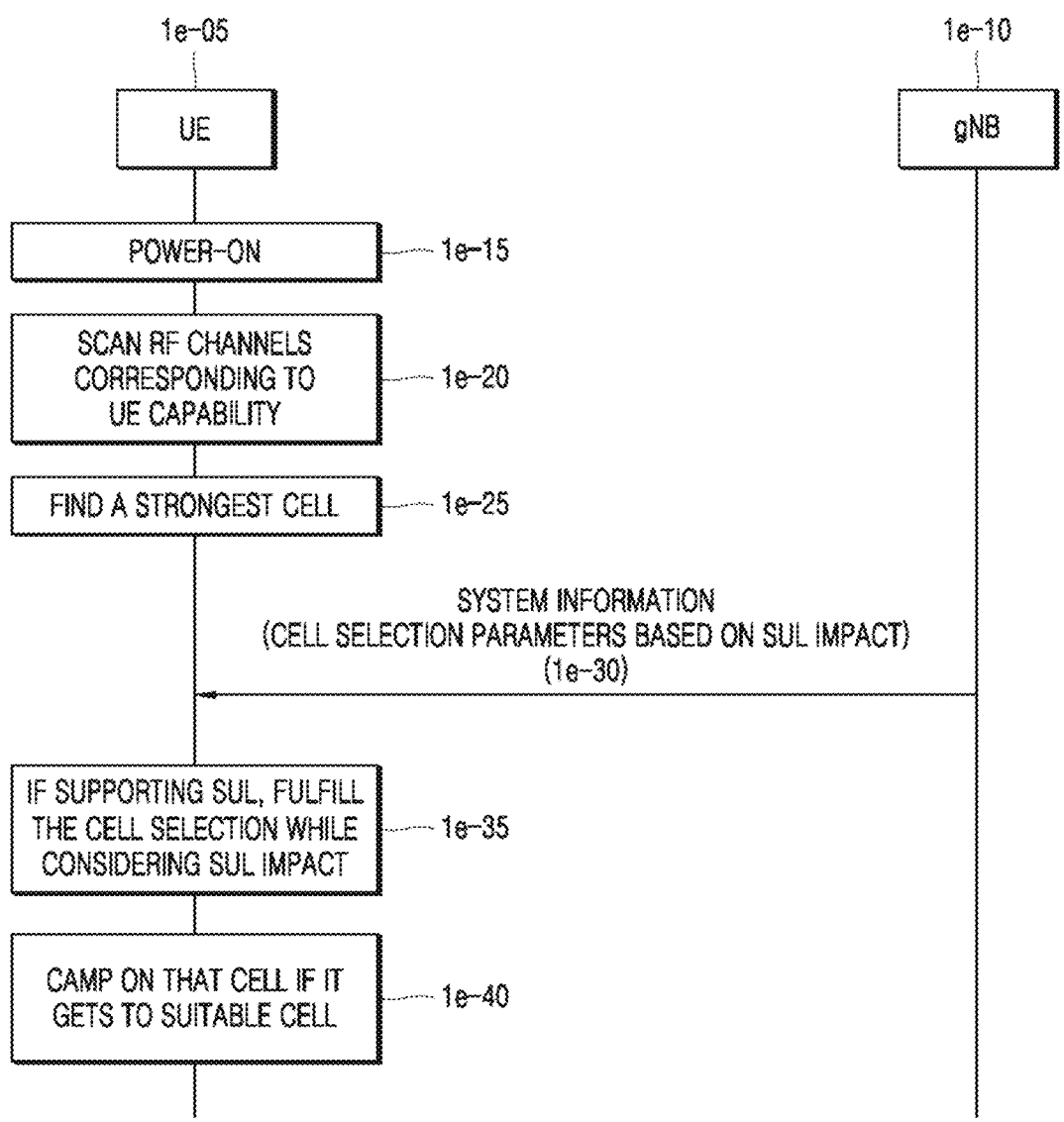

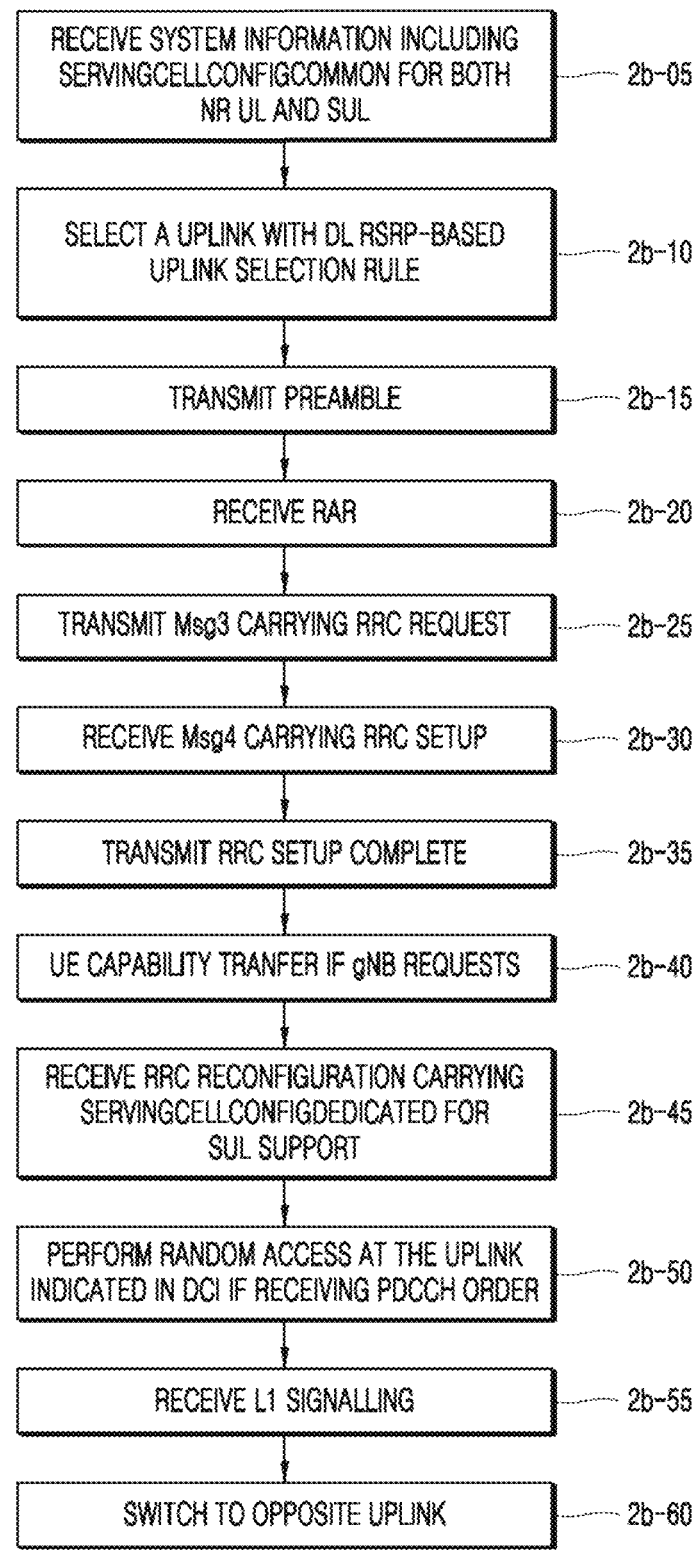

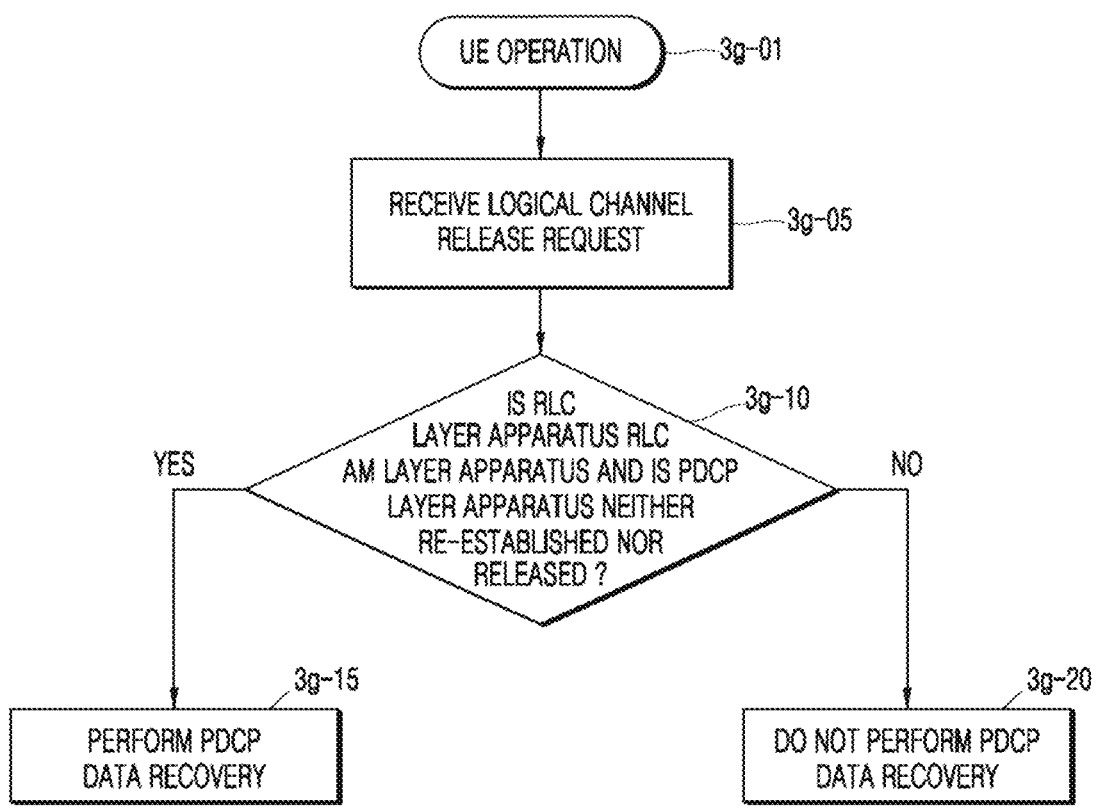

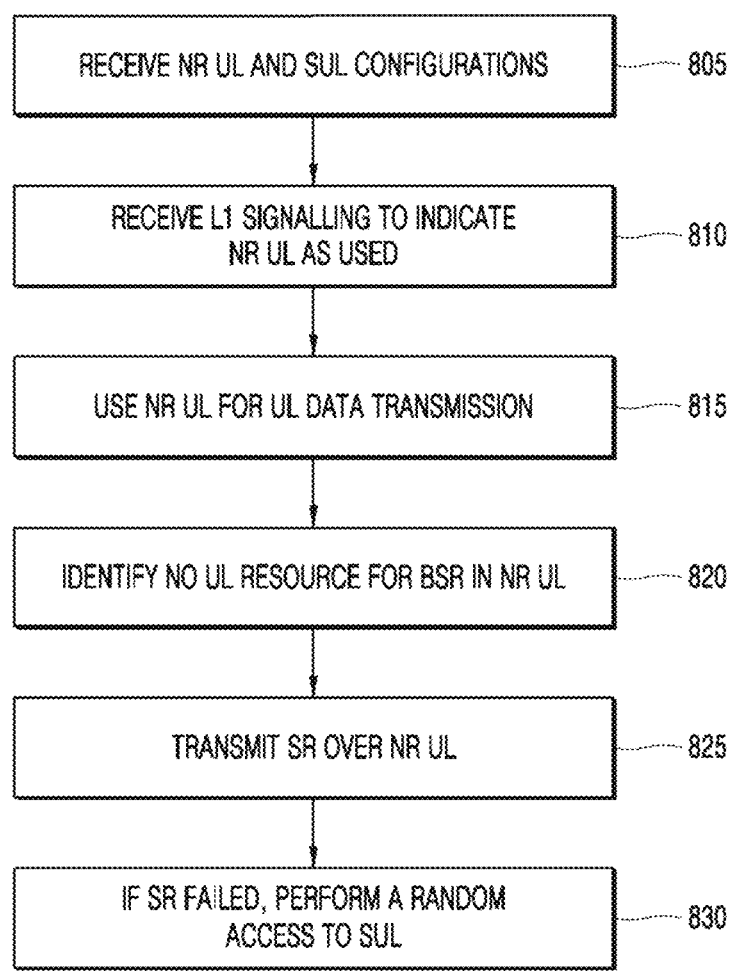

PERFORMING CELL SELECTION PROCEDURE BASED ON SUPPLEMENTARY UPLINK (SUL) TECHNOLOGY

CROSS-REFERENCE TO RELATED APPLICATIONS

This application is a Continuation of U.S. patent application Ser. No. 17/306,823 filed May 3, 2021, now U.S. Pat. No. 11,838,976 issued Dec. 5, 2023, which is a Divisional of U.S. patent application Ser. No. 16/186,185 filed on Nov. 9, 2018, which is based on and claims priority under 35 U.S.C. § 119 to Korean Patent Application No. 10-2017-0153117 filed on Nov. 16, 2017, and Korean Patent Application No. 10-2017-0148448 filed on Nov. 9, 2017 in the Korean Intellectual Property Office, the disclosures of which are herein incorporated by reference in their entirety.

BACKGROUND

1. Field

The disclosure relates to wireless communication systems, and more particularly, to methods and apparatuses for transmitting and receiving signals in wireless communication systems.

2. Description of Related Art

To meet the increase in demand for wireless data traffic after the commercialization of 4G communication systems, considerable efforts have been made to develop improved 5G communication systems or pre-5G communication systems. This is one reason why '5G communication systems' or 'pre-5G communication systems' are called 'beyond 4G network communication systems' or 'post Long Term Evolution (LTE) systems'. In order to achieve a high data rate, 5G communication systems are being developed to be implemented in a super-high frequency band (millimeter wave (mmWave)), e.g., a band of 60 GHz. In order to reduce path loss in such a super-high frequency band and to increase a propagation distance of electric waves in 5G communication systems, various technologies such as beamforming, massive multiple input multiple output (massive MIMO), full dimensional MIMO (FD-MIMO), array antennas, analog beamforming, and large scale antennas are being studied. In order to improve system networks for 5G communication systems, various technologies such as evolved small cells, advanced small cells, cloud radio access networks (cloud RAN), ultra-dense networks, device-to-device communication (D2D), wireless backhaul, moving networks, cooperative communication, coordinated multi-points (CoMP), and interference cancellation have been developed. In addition, for 5G communication systems, advanced coding modulation (ACM) technologies such as hybrid frequency shift keying (FSK) and quadrature amplitude modulation (QAM) (FOAM) and sliding window superposition coding (SWSC) and advanced access technologies such as filter bank multi-carrier (FBMC), non-orthogonal multiple access (NOMA), and sparse code multiple access (SCMA) have been developed.

The Internet has evolved from a human-based connection network, where humans create and consume information, to the Internet of things (IoT), where distributed elements such as objects exchange information with each other to process the information. Internet of everything (IoE) technology, in which the IoT technology is combined with, for example, technology for processing big data through connection with a cloud server, is being newly provided. In order to implement the IoT, various technological elements such as a sensing technology, wired/wireless communication and network infrastructures, a service interface technology, and a security technology are used. In recent years, technologies related to sensor networks for connecting objects, machine-to-machine (M2M) communication, and machine type communication (MTC) have been studied. In the IoT environment, intelligent Internet technology (IT) services may be provided to collect and analyze data obtained from connected objects and thus to create new values in human life. As existing information technology (IT) and various industries converge and combine with each other, the IoT may be applied to various fields such as smart homes, smart buildings, smart cities, smart cars or connected cars, smart grids, health care, smart home appliances, and advanced medical services.

Various attempts are being made to apply 5G communication systems to the IoT network. For example, technologies related to sensor networks, M2M communication, MTC, etc. are implemented by using beamforming, MIMO, array antennas, etc. Application of a cloud RAN as the above-described big data processing technology may be an example of convergence of the 5G communication technology and the IoT technology.

As one of various technologies capable of satisfying increasing demands for large-capacity data communication, a method of providing multiple connections has been disclosed. For example, multiple connections may be provided using multiple carriers according to a carrier aggregation (CA) technique for LTE systems. As such, users may use more resources to receive services. In addition, the LTE systems may provide various services including broadcast services such as multimedia broadcast multicast service (MBMS).

SUMMARY

Unequal uplink and downlink service areas may occur in wireless communication systems. In this case, an uplink or downlink service area may be limited or reduced to avoid service quality deterioration and thus the service area may not be efficiently used.

In wireless communication systems, dual connectivity may be used to transmit more data at high speed in downlinks and uplinks or used to transmit data in duplicate to increase reliability. Dual connectivity may be configured for multiple bearers. Therefore, a procedure for changing a bearer type from a split bearer using dual connectivity to a normal bearer (e.g., a master cell group (MCG) bearer or a secondary cell group (SCG) bearer) or releasing each SCG bearer using dual connectivity by independently releasing logical channels of the split bearer or the SCG bearer is used.

In uplinks of wireless communication systems, since user equipment (UE) has a physically small size and a high frequency band and a wide bandwidth are not easily usable as an uplink frequency band, a bottleneck phenomenon may occur in uplink transmission resources compared to downlink transmission resources. In addition, since the maximum Tx power level of the UE is less than the maximum Tx power level of an evolved node B (eNB) or a next-generation node B (gNB), a problem of reduction in coverage for uplink data transmission may occur.

In accordance with an aspect of the disclosure, a method, performed by a user equipment (UE), of transmitting and receiving signals in a wireless communication system includes receiving a logical channel release request from a next-generation node B (gNB), determining a logical channel to release, an operation mode of the logical channel to release, and whether a packet data convergence protocol (PDCP) layer apparatus connected to the logical channel is re-established, based on the logical channel release request, and performing PDCP data recovery based on the determination result.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document. Those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 1E is a flowchart illustrating an operation of performing cell selection in consideration of an additional uplink frequency, according to an embodiment;

FIG. 2B is a flowchart illustrating a UE operation for configuring an additional uplink frequency, according to an embodiment;

FIG. 3G is a flowchart illustrating a UE operation when a UE receives a logical channel release request from a gNB, according to an embodiment;

FIG. 8 is a flowchart illustrating a UE operation for requesting scheduling.

DETAILED DESCRIPTION

Figure 1A:
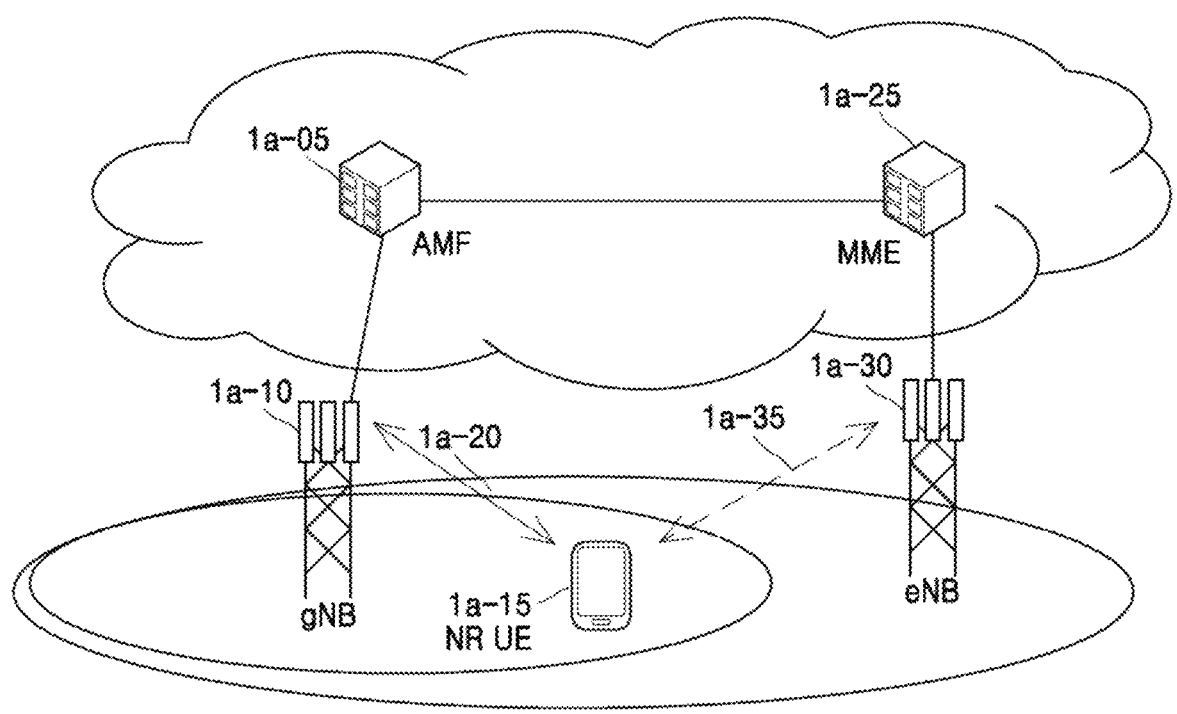
FIG. 1A is a diagram illustrating the structure of a new radio (NR) system.

FIGS. 1A through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

In the following description of the present disclosure, detailed descriptions of known functions and configurations incorporated herein will be omitted when it may make the subject matter of the present disclosure unclear. The terms used in the specification are defined in consideration of functions used in the present disclosure, and may be changed according to the intent or conventionally used methods of operators and users. Accordingly, definitions of the terms should be understood on the basis of the entire description of the present specification.

Hereinafter, the present disclosure will be described in detail by explaining embodiments of the disclosure with reference to the attached drawings. Like reference numerals in the drawings denote like elements. Expressions such as "at least one of," when preceding a list of elements, modify the entire list of elements and do not modify the individual elements of the list.

Terms identifying access nodes, terms indicating network entities, terms indicating messages, terms indicating interfaces between network entities, terms indicating various types of identification information, and so on that are used in the following description are exemplified for convenience of explanation. Accordingly, the present disclosure is not limited to terms to be described below and other terms indicating objects having the equivalent technical meanings may be used.

Hereinafter, for convenience of explanation, the present disclosure uses terms and names that are defined in the 3rd Generation Partnership Project Long Term Evolution (3GPP LTE). However, the present disclosure is not limited to the terms and names but may be equally applied to systems following other standards. Herein, for convenience of explanation, the terms evolved node B (eNB) and next-generation node B (gNB) may be used interchangeably. That is, a base station described as an eNB may indicate a gNB, or vice versa.

FIG. 1A is a diagram illustrating the structure of a new radio (NR) system.

Referring to FIG. 1A, a radio access network of the NR system may include a new radio node B (NR NB, NR gNB, or gNB) 1a-10 and an AMF (or new radio core network (NR CN) or next-generation core network (NG CN)) 1a-05. New radio user equipment (NR UE) 1a-15 may access an external network via the gNB 1a-10 and the AMF 1a-05.

In FIG. 1A, the gNB 1a-10 corresponds to an evolved node B (eNB) of a legacy Long Term Evolution (LTE) system. The gNB 1a-10 is connected to the NR UE 1a-15 through radio channels and may provide superior services compared to a legacy node B (1a-20). Since all user traffic data is serviced through shared channels in the NR system, an apparatus for collating buffer status information of UEs, available Tx power status information, channel status information, etc. and performing scheduling is used and the gNB 1a-10 may serve as such an apparatus. A single gNB may generally control multiple cells. A bandwidth greater than the maximum bandwidth of legacy LTE may be given to achieve high speed data transmission, compared to the existing LTE system, and beamforming technology may be added to radio access technology such as orthogonal frequency-division multiplexing (OFDM). Adaptive modulation & coding (AMC) may also be used to determine a modulation scheme and a channel coding rate in accordance with a channel status of the NR UE 1a-15. The AMF 1a-05 may perform functions such as mobility support, bearer setup, and quality of service (QoS) setup. The AMF 1a-05 is an apparatus for performing a mobility management function and various control functions for the NR UE 1a-15 and may be connected to multiple gNBs. The NR system may cooperate with the legacy LTE system, and the AMF 1a-05 may be connected to a mobility management entity (MME) 1a-25 through a network interface. The MME 1a-25 may be connected to a legacy eNB 1a-30. The NR UE 1a-15 supporting LTE-NR dual connectivity may be connected to and transmit and receive data to and from the gNB 1a-10 and the eNB 1a-30 (1a-35).

Figure 1B:
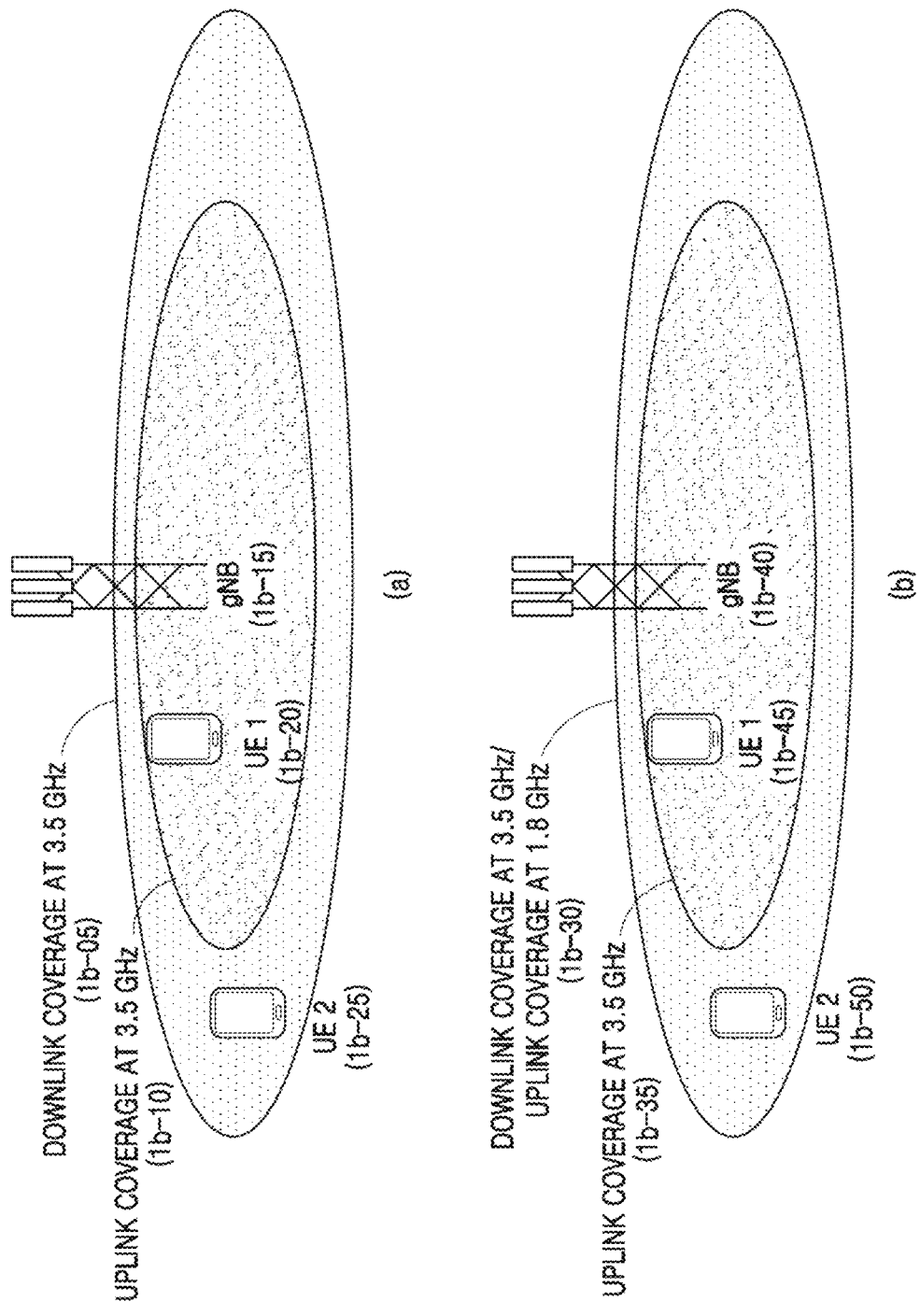
FIG. 1B includes conceptual diagrams illustrating a method of using an additional uplink frequency according to an embodiment.

FIG. 1B includes conceptual diagrams illustrating a method of using an additional uplink frequency according to an embodiment.

In some cases, uplink and downlink service areas of a mobile communication system may not equal. The unequal service areas may occur due to different uplink and downlink channel characteristics or due to a limitation of the maximum Tx power level or a structural limitation of a Tx antenna of a UE. In general, the downlink service area may be wider than the uplink service area. For example, in a time-division duplex (TDD) system of 3.5 GHz, a downlink service area 1b-05 is wider than an uplink service area 1b-10. In this case, a first UE 1b-20 has no problem in receiving uplink and downlink services, but a second UE 1b-25 may have a problem in transmitting uplink data to a gNB 1b-15. Therefore, to solve the problem due to unequal service areas, a valid downlink service area may be reduced to be equal to the uplink service area. That is, although a wider downlink service area is providable, to reduce the problem due to unequal service areas, the downlink service area is reduced to be equal to the uplink service area.

In a NR system, to solve a limitation of performance due to unequal service areas, a UE may use an uplink frequency corresponding to a wider service area. For example, an uplink frequency 1b-30 of 1.8 GHz may be provided to a UE in addition to an uplink frequency 1b-35 of 3.5 GHz. The additional uplink frequency is called a supplementary uplink (SUL) frequency. Based on frequency characteristics, a radio range increases in a lower frequency range. Thus, 1.8 GHz, which is lower than 3.5 GHz, may provide a wider service area. Therefore, a second UE 1b-50 may successfully transmit data to a gNB 1b-40 by using the uplink frequency 1b-30 of 1.8 GHz.

Irrespective of the service area problem, since both uplink frequencies of 1.8 GHz and 3.5 GHz are available to a first UE 1b-45, the first UE 1b-45 may select and use one of 1.8 GHz and 3.5 GHz to avoid congestion of uplink traffic. In this case, the additional uplink frequency may be an LTE frequency.

Both a NR uplink frequency and a SUL frequency may be configured for UE, and uplink data such as physical uplink shared channel (PUSCH) data may be transmitted on only one uplink at a time. Physical uplink control channel (PUCCH) data may also be transmitted on only one uplink at a time, and the uplink for PUCCH transmission may be the same as or different from the uplink for PUSCH transmission.

A gNB supporting SUL may provide a first threshold value used to determine an uplink for attempting random access, to UEs in a cell by using system information. A UE supporting SUL may calculate a reference signal received power (RSRP) by measuring a sync signal block (SSB) broadcasted by the gNB on a downlink, and compare the RSRP to the first threshold value. When a measured downlink channel quality is lower than the first threshold value, the UE may select a SUL frequency as the uplink for attempting random access. When the measured downlink channel quality is not lower than the first threshold value, the UE may perform random access at a NR uplink frequency.

Figure 1C:
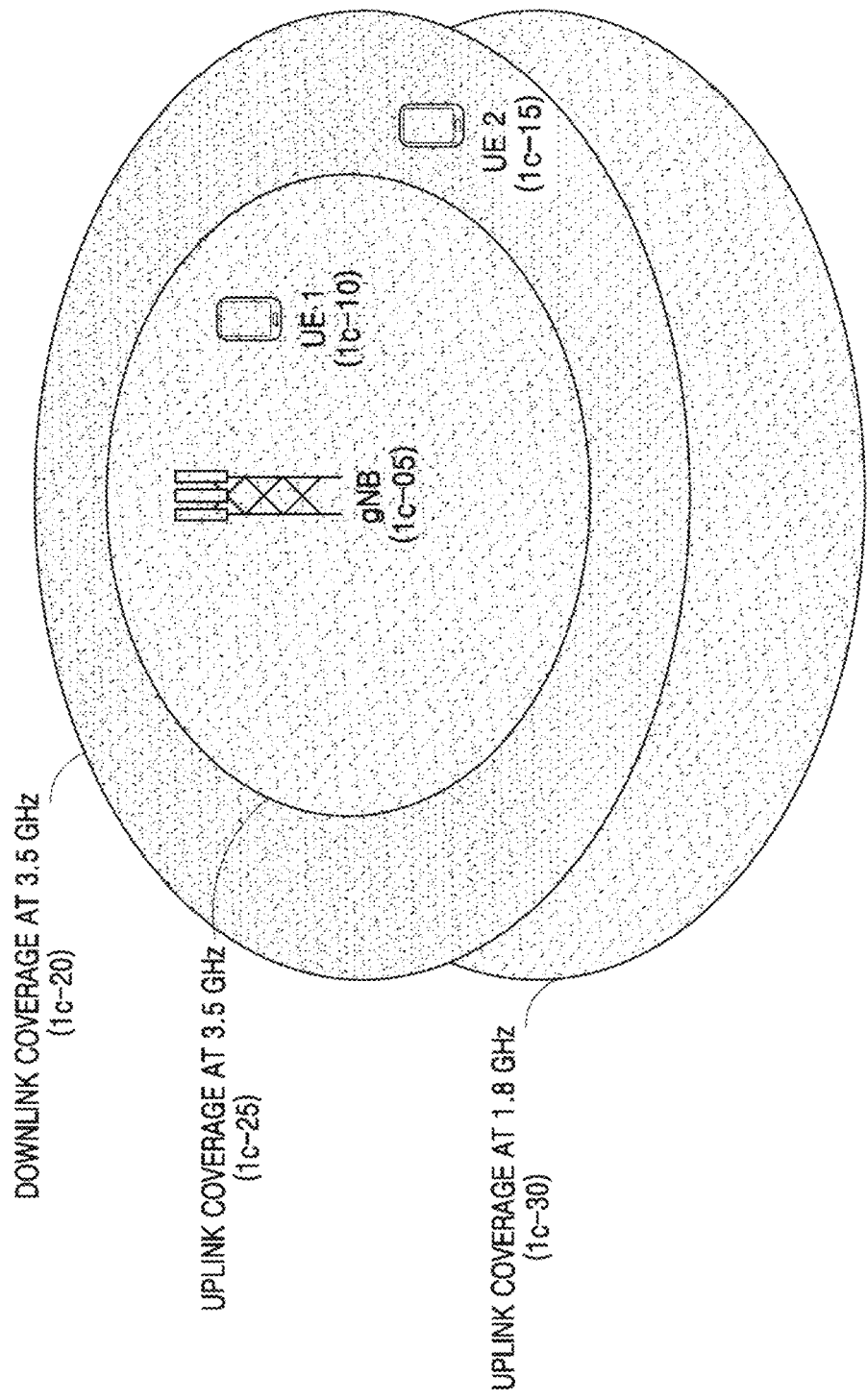
FIG. 1C is a diagram illustrating uplink and downlink service areas in a NR system.

FIG. 1C is a diagram illustrating uplink and downlink service areas in a NR system.

A problem of unequal uplink and downlink service areas in a mobile communication system has been described above. The problem of unequal service areas may influence cell selection. In the mobile communication system, cell selection refers to an operation of selecting a cell to be camped on by a UE in a standby mode. The UE may select a cell by determining whether the UE satisfies S-criteria. The UE may monitor whether a paging message is received from the selected cell, and perform random access to access the selected cell. For example, a first UE 1c-10 is located inside uplink and downlink service areas and thus has no problem in selecting a cell. However, a second UE 1c-15 may be located inside a downlink service area 1c-20 but outside an uplink service area 1c-25. This may mean that a signal of the second UE 1c-15 does not reach a gNB 1c-05 although the maximum Tx power level of the second UE 1c-15 is used. The S-criteria applicable to the NR system may include S-criteria for LTE. The S-criteria for LTE are as described below. In this case, the second UE 1c-15 does not satisfy the S-criteria and may not select a cell.

Srxlev>0 AND Squal>0  [Inequality 1]

where:

Srxlev=$Q_{rxlevmeas}$−($Q_{rxlevmin}$+$Q_{rxlevminoffset}$)−Pcompensation−$Qoffset_{temp}$ Squat=$Q_{qualmeas}$−($Q_{qualmin}$+$Q_{qualminoffset}$)−$Qoffset_{temp}$ where:

TABLE 1

| S-Criteria Parameters | |
| --- | --- |
| Srxlev | Cell selection RX level value (dB) |
| Squal | Cell selection quality value (dB) |
| $Qoffset_{temp}$ | Offset temporarily applied to a cell as specified in [3] (dB) |
| $Q_{rxlevmeas}$ | Measured cell RX level value (RSRP) |
| $Q_{qualmeas}$ | Measured cell quality value (RSRQ) |
| $Q_{rxlevmin}$ | Minimum required RX level in the cell (dBm) |
| $Q_{qualmin}$ | Minimum required quality level in the cell (dB) |
| $Q_{rxlevminoffset}$ | Offset to the signaled $Q_{rxlevmin}$ taken into account in the Srxlev evaluation as a result of a periodic search for a higher priority PLMN while camped normally in a VPLMN [5] |
| $Q_{qualminoffset}$ | Offset to the signaled $Q_{qualmin}$ taken into account in the Squal evaluation as a result of a periodic search for a higher priority PLMN while camped normally in a VPLMN [5] |
| Pcompensation | If the UE supports the additionalPmax in the NS-PmaxList, if present, in SIB1, SIB3 and SIB5:<br>[Expression 2]max($P_{EMAX1}$ − $P_{PowerClass}$, 0) − (min($P_{EMAX2}$, $P_{PowerClass}$) − min($P_{EMAX1}$, $P_{PowerClass}$)) (dB);<br>else:<br>[Expression 3]max($P_{EMAX1}$ − $P_{PowerClass}$, 0) (dB) |
| $P_{EMAX1}$, $P_{EMAX2}$ | Maximum TX power level an UE may use when transmitting on the uplink in the cell (dBm) defined as $P_{EMAX}$ in TS 36.101 [33]. $P_{EMAX1}$ and $P_{EMAX2}$ are obtained from the p-Max and the NS-PmaxList respectively in SIB1, SIB3 and SIB5 as specified in TS 36.331 [3]. |
| $P_{PowerClass}$ | Maximum RF output power of the UE (dBm) according to the UE power class as defined in TS 36.101 [33] |

The S-criteria will now be described in detail. To provide a wider service area to a UE supporting a higher maximum Tx power level, an additional cell selection parameter is defined and Pcompensation is revised. Mobile carriers tend to configure a Q_rxlevmin value in accordance with an uplink service area. For example, the Q_rxlevmin value is configured in such a manner that a UE having a maximum Tx power level of 17 dBm may select a corresponding cell. From Rel-10, UEs having higher maximum Tx power levels of 20 dBm and 23 dBm may be supported and wider service areas may be provided to the UEs.

In the 3GPP standards, new P_EMAX2 applicable by UEs is adopted and the definition of Pcompensation is revised to have a positive value when, for example, P_PowerClass≥P_EMAX2>P_EMAX1.

Compared to a NR uplink frequency, a SUL frequency 1c-30 is located in a lower frequency range and thus may provide a wider uplink service area. Therefore, UE supporting SUL may select a cell in consideration of a SUL service area. A cell which is not selectable in consideration of a NR uplink service area may be selected in consideration of the SUL service area.

An embodiment proposes a method of performing a cell selection operation in consideration of a SUL service area.

In this regard, a gNB provides a new cell selection parameter and a UE may determine whether the S-criteria are satisfied, by using the new cell selection parameter.

Figure 1D:
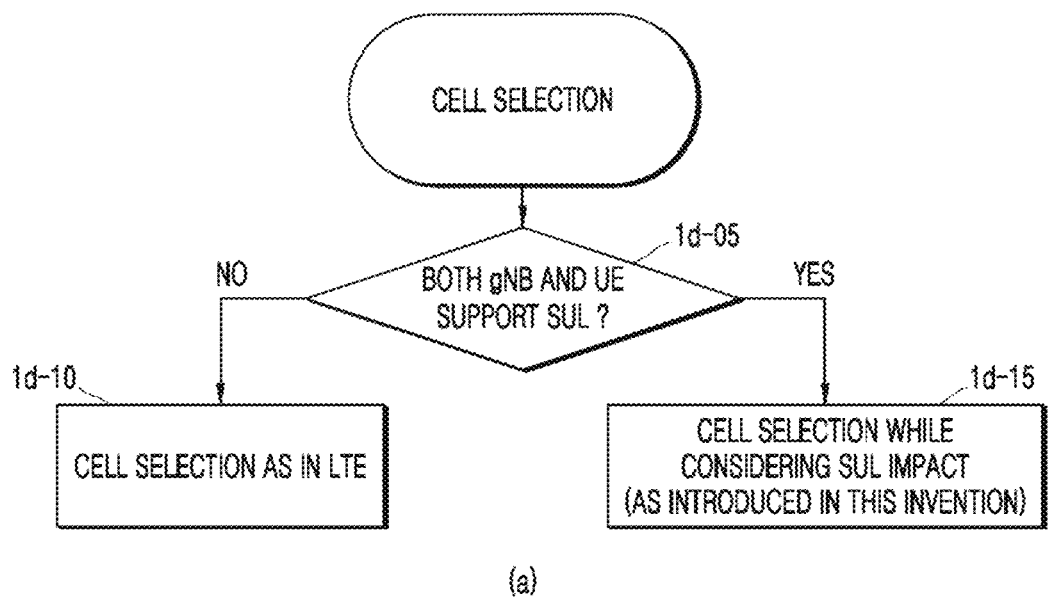
FIG. 1D illustrates flowcharts of methods of performing cell selection in consideration of an additional uplink frequency, according to embodiments.
Figure 1D:
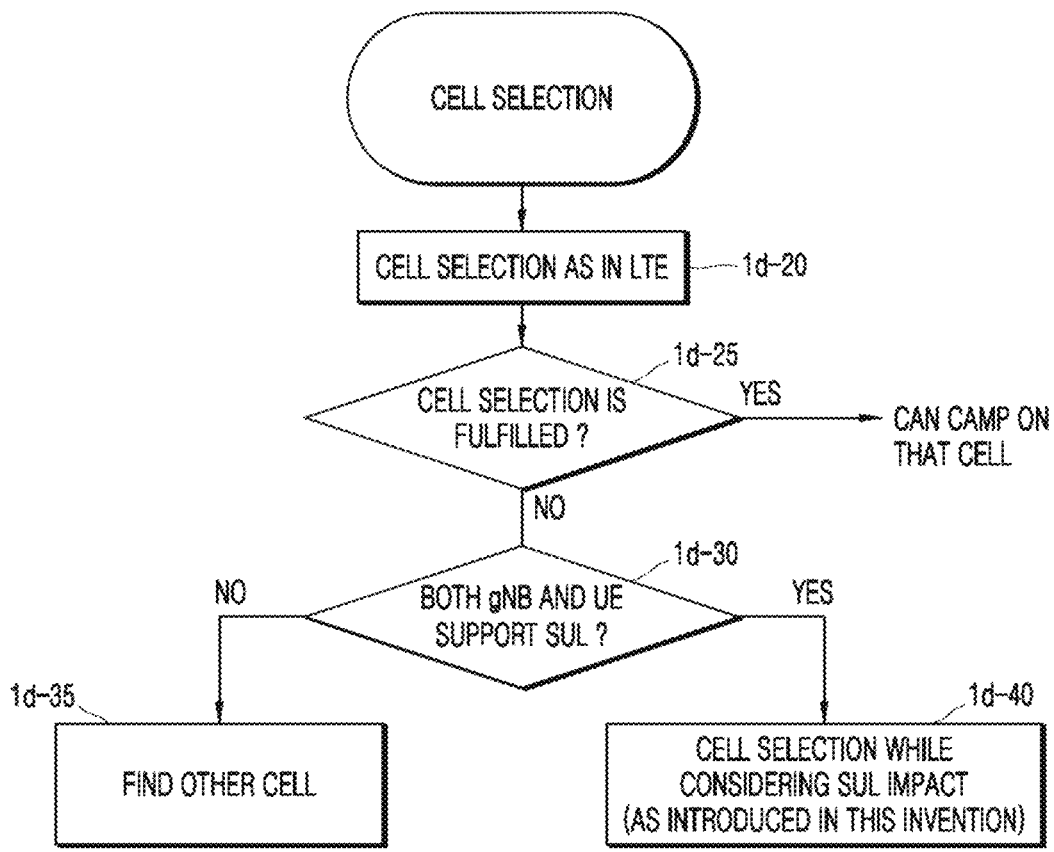

FIG. 1D illustrates flowcharts of methods of performing cell selection in consideration of an additional uplink frequency, according to embodiments.

In a first method of initializing a cell selection operation considering an additional uplink frequency, it may be determined whether both a gNB and a UE support SUL technology (1d-05). Whether both the gNB and the UE support SUL technology will be described in relation to a first criterion. When the first criterion is satisfied, the UE may perform a cell selection operation in consideration of influence of SUL (1d-15).

A criterion that a measured downlink channel quality needs to be lower than a first threshold value may be added to the first criterion. As described above, the UE may perform random access at the SUL frequency only when the downlink channel quality is lower than the first threshold value. Therefore, the additional criterion may be further considered. When the first criterion is not satisfied, the UE may perform a cell selection operation of LTE or a cell selection operation not considering influence of SUL (1d-10). The cell selection operation considering influence of SUL will be described below. The UE may determine whether the gNB supports SUL, by receiving a SUL-related parameter broadcasted by the gNB.

In a second method of initializing a cell selection operation considering an additional uplink frequency, the UE initially performs a cell selection operation of LTE or a cell selection operation not considering influence of SUL (1d-20). It may be determined whether the S-criteria are satisfied and thus a cell is selected in the cell selection operation (1d-25). When the S-criteria are satisfied and thus the cell is selected, the UE may camp on the cell. Otherwise, when the S-criteria are not satisfied, the UE may determine whether the first criterion is satisfied (1d-30). When the first criterion is satisfied, the UE may perform a cell selection operation in consideration of influence of SUL (1d-40). Otherwise, when the first criterion is not satisfied, the UE may search for another cell (1d-35).

FIG. 1E is a flowchart illustrating an operation of performing cell selection in consideration of an additional uplink frequency, according to an embodiment.

UE 1e-05 may be powered on (1e-15) and then scan radio-frequency (RF) channels in a band supportable based on UE capability (1e-20). However, the above description merely corresponds to an example and, alternatively, the UE 1e-05 may scan pre-stored RF channels. The UE 1e-05 may find a frequency corresponding to the highest signal power among the channels (1e-25). The UE 1e-05 may receive system information broadcasted by a certain gNB 1e-10, at the frequency (1e-30). The system information may include cell selection parameters.

When the gNB 1e-10 supports SUL function, the system information may also include a SUL-related cell selection parameter. The SUL-related cell selection parameter differs depending on embodiments and will be described below together with the embodiments. The UE 1e-05 may perform a cell selection operation by using the first or second method. For example, when the UE 1e-05 supports SUL function, a cell selection operation considering influence of SUL may be performed (1e-35). That is, whether to perform cell selection may be determined by substituting the SUL-related cell selection parameter in an expression of the S-criteria. When the expression of the S-criteria is satisfied and a corresponding cell is ultimately regarded as a suitable cell in further consideration of public land mobile network (PLMN) selection and barring, the UE 1e-05 may camp on the cell (1e-40).

Figure 1F:
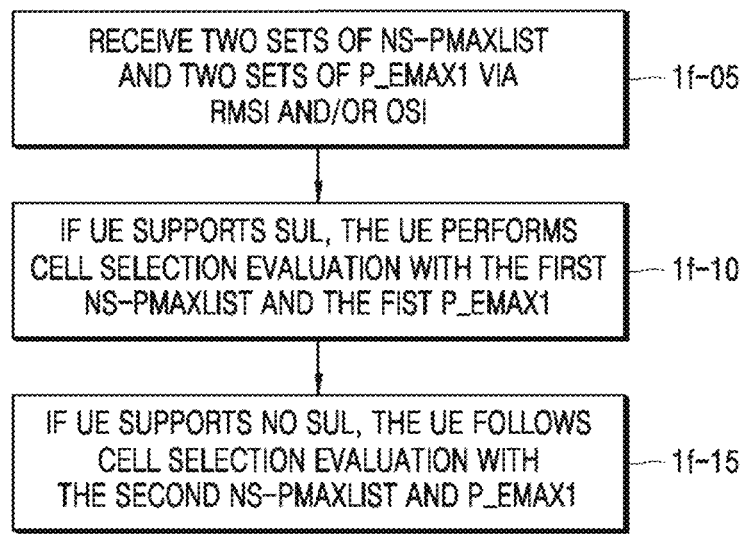
FIG. 1F is a flowchart illustrating a user equipment (UE) operation for performing cell selection in consideration of an additional uplink frequency, according to an embodiment.

FIG. 1F is a flowchart illustrating a UE operation for performing cell selection in consideration of an additional uplink frequency, according to an embodiment.

In an embodiment, a UE may receive a first NS-PmaxList, a second NS-PmaxList, a first P_EMAX1, and a second P_EMAX1 which are broadcasted as system information from a gNB (1f-05). In this case, the system information may include, for example, at least one of remaining minimum system information (RMSI) and other system information (OSI).

The NS-PmaxList may include one or more P-Max values and one or more additionalSpectrumEmission values. The P-Max value included in the NS-PmaxList may correspond to P_EMAX2 of [Expression 2]. The ASN.1 format of the NS-PmaxList shown below is captured from the ASN.1 of LTE for reference. It is regarded that a similar ASN.1 format will be defined for a NR system.

| NS-PmaxList information element |
|---|
| -- ASN1START<br>NS-PmaxList-r10 ::=    SEQUENCE (SIZE (1..maxNS-Pmax-r10)) OF NS-PmaxValue-r10<br>NS-PmaxValue-r10 ::=    SEQUENCE {<br>   additionalPmax-r10                              P-Max<br>   OPTIONAL, -- Need OP<br>   additionalSpectrumEmission              AdditionalSpectrumEmission<br>}<br>-- ASN1STOP |

In an embodiment, the first NS-PmaxList and first P_EMAX1 values may be determined in consideration of influence of SUL. The second NS-PmaxList and second P_EMAX1 values may be determined similarly to those of LTE. That is, the P_EMAX1 value may generally indicate the lowest maximum Tx power level value applicable in a cell, although the definition thereof is variable. In this case, propagation characteristics of a NR uplink frequency will be considered. For a UE supporting a higher maximum Tx power level, the second NS-PmaxList values may be provided. In general, the P_EMAX2 value included in the NS-PmaxList is greater than the P_EMAX1 value. As such, when the maximum Tx power level value of the UE is greater than the P_EMAX1 value, [Expression 2] may have a negative value and, ultimately, [Inequality 1] may be satisfied. An increase in the maximum Tx power level of the UE may lead to an increase in an uplink service area, and [Expression 2] may expand an entire cell service area based on expansion of the uplink service area. Considering SUL for cell selection means that the uplink service area is expanded.

Thus, the effect thereof equals the effect of an increase in the maximum Tx power level of the UE. Therefore, in the present disclosure, the first NS-PmaxList and first P_EMAX1 values may be determined to be less than the second NS-PmaxList and second P_EMAX1 values by a value α. In this case, the value α may be determined in consideration of a difference in service area or propagation characteristics between a NR uplink frequency and a SUL frequency. For example, a difference in path loss between the NR uplink frequency and the SUL frequency may be configured as the value α. The effect thereof equals the effect of an increase in the maximum Tx power level of the UE.

When the first criterion is satisfied, the UE may determine whether [Inequality 1] is satisfied, by substituting the first NS-PmaxList and first P_EMAX1 values in [Expression 2] (1f-10). When [Inequality 1] is satisfied, the UE may select a corresponding cell. When the first criterion is not satisfied, the UE may determine whether [Inequality 1] is satisfied, by substituting the first NS-PmaxList and first P_EMAX1 values in [Expression 2] (1f-15). When [Inequality 1] is satisfied, the UE may select a corresponding cell.

Although an embodiment is described above based on the first method, the first method is merely an example and the second method may also be applicable.

Figure 1G:
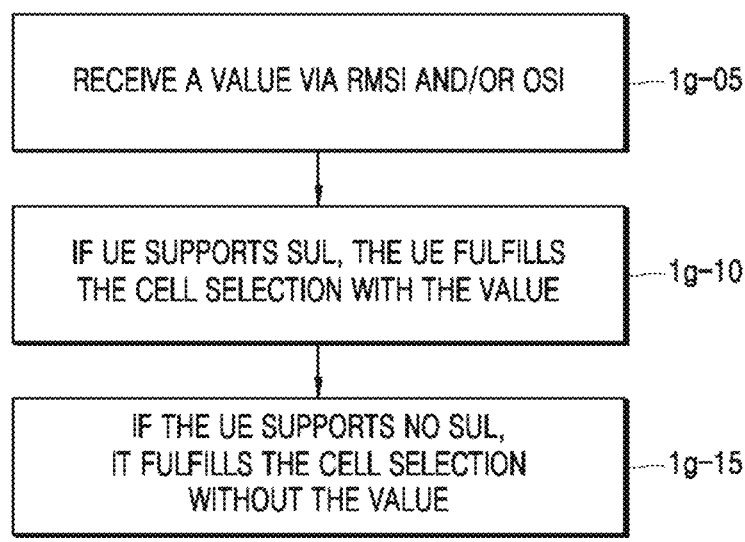
FIG. 1G is a flowchart illustrating a UE operation for performing cell selection in consideration of an additional uplink frequency, according to an embodiment.

FIG. 1G is a flowchart for describing a UE operation for performing cell selection in consideration of an additional uplink frequency, according to an embodiment.

In an embodiment, a UE may receive, from a gNB, a second NS-PmaxList and a second P_EMAX1, which are similar to those of LTE, as system information and further receive a value α indicating a difference in service area or propagation characteristics between a NR uplink frequency and a SUL frequency (1g-05). In this case, the system information may include, for example, at least one of remaining minimum system information (RMSI) and other system information (OSI). For example, a difference in path loss between the NR uplink frequency and the SUL frequency may be configured as the value α.

The value α may be configured as a difference between Q_rxlevmin and a first threshold value. In this case, the gNB does not additionally provide the a value as the system information. The Q_rxlevmin value indicates the minimum required Rx level in a corresponding cell (e.g., RSRP).

When the first criterion is satisfied, the UE may determine whether [Inequality 1] is satisfied, by substituting values obtained by subtracting the value α from the second NS-PmaxList and second P_EMAX1 values, in [Expression 2] (1g-10). Alternatively, the UE may determine whether [Inequality 1] is satisfied, by substituting a value obtained by adding the value α to the maximum Tx power level value of the UE (e.g., P_PowerClass) in [Expression 2]. The effect of the preprocessing operation using the value α equals the effect of an increase in the maximum Tx power level of the UE due to influence of the SUL frequency. When [Inequality 1] is satisfied, the UE may select a cell. When the first criterion is not satisfied, the UE may determine whether [Inequality 1] is satisfied, by substituting the second NS-PmaxList and second P_EMAX1 values in [Expression 2] (1g-15). When [Inequality 1] is satisfied, the UE may select a cell.

Although an embodiment is described above based on the first method, the second method may also be applicable.

Figure 1H:
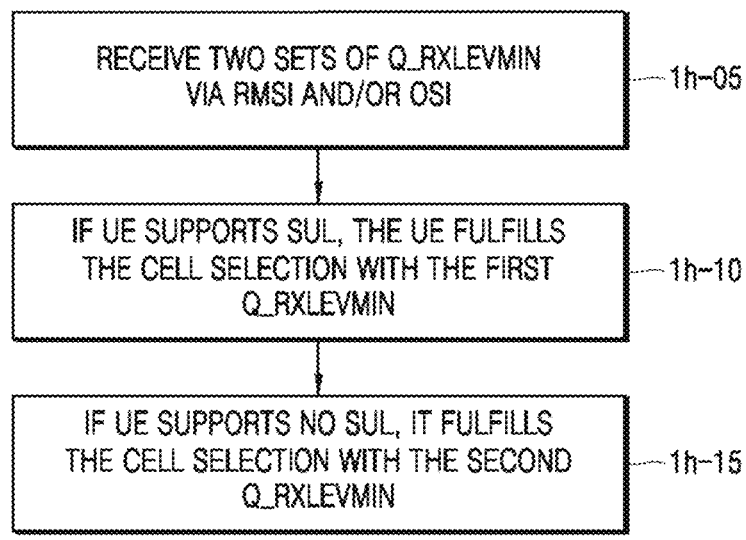
FIG. 1H is a flowchart illustrating a UE operation for performing cell selection in consideration of an additional uplink frequency, according to an embodiment.

FIG. 1H is a flowchart illustrating a UE operation for performing cell selection in consideration of an additional uplink frequency, according to an embodiment.

In an embodiment, a UE may receive a Q_rxlevmin value considering influence of SUL, as system information from a gNB (1h-05). In this case, the system information may include, for example, at least one of remaining minimum system information (RMSI) and other system information (OSI). For example, a difference between the Q_rxlevmin value and an existing Q_rxlevmin value is a difference in service area or propagation characteristics between a NR uplink frequency and a SUL frequency. Alternatively, the gNB may provide the difference value.

When the first criterion is satisfied, the UE may determine whether [Inequality 1] is satisfied, by using the Q_rxlevmin value considering the influence of SUL (1h-10). When [Inequality 1] is satisfied, the UE may select a corresponding cell. When the first criterion is not satisfied, the UE may determine whether [Inequality 1] is satisfied, by using the existing Q_rxlevmin value (1h-15). When [Inequality 1] is satisfied, the UE may select a corresponding cell.

Although an embodiment is described above based on the first method, the second method may also be applicable.

Figure 2A:
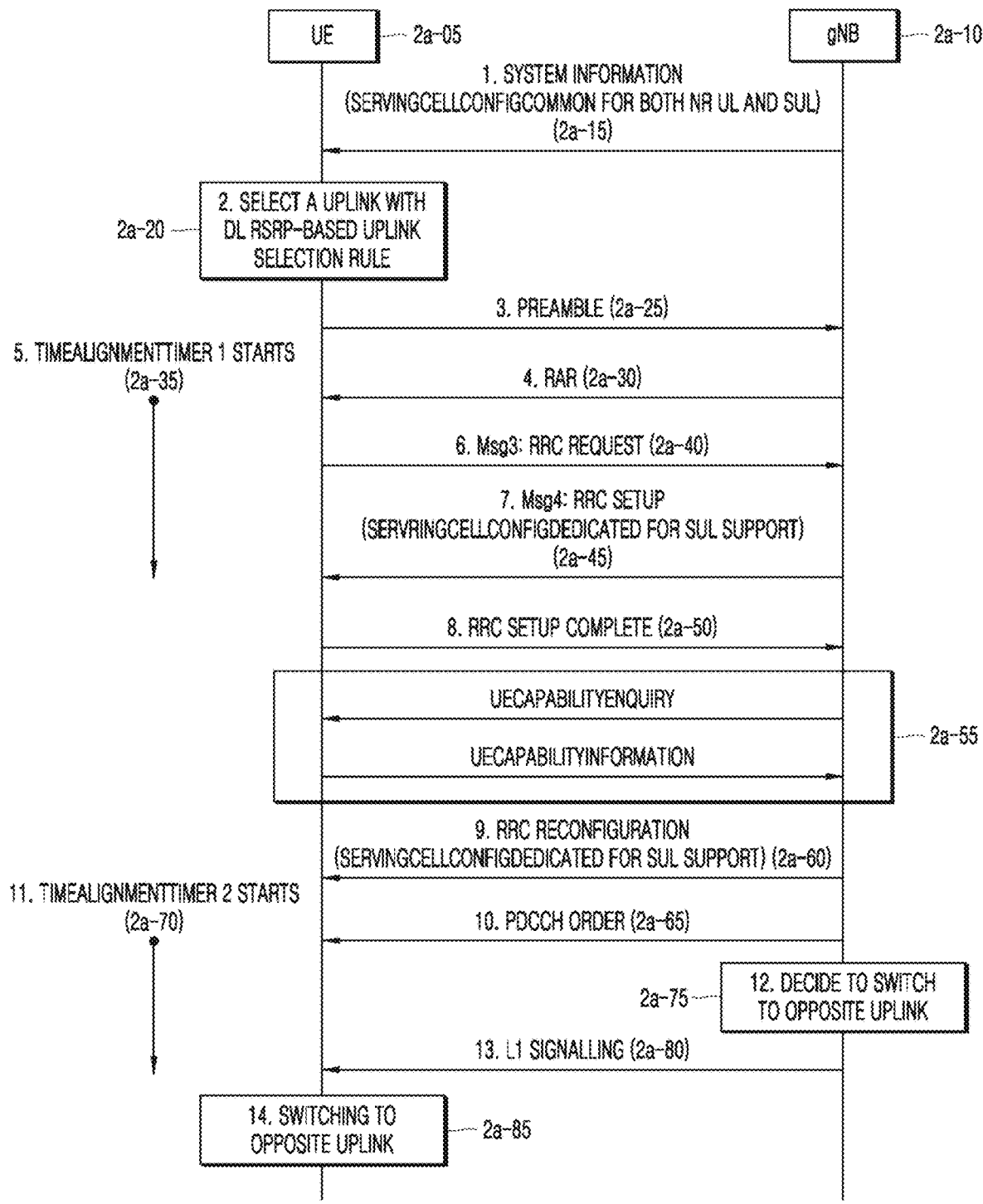
FIG. 2A is a flowchart illustrating an operation of configuring an additional uplink frequency, according to an embodiment.

FIG. 2A is a flowchart illustrating an operation of configuring an additional uplink frequency, according to an embodiment.

A UE 2a-05 may receive system information from a gNB 2a-10 (2a-15). The system information may include servingCellConfigCommon information element (IE). The IE may include configuration information about a NR uplink frequency and a SUL frequency. The configuration information may include random-access channel (RACH), PUCCH, and PUSCH configuration information to be applied to the SUL frequency as well as the NR uplink frequency, and frequency information of the SUL frequency, e.g., information about a center frequency, a bandwidth, and a frequency band to which the SUL frequency belongs. The configuration information is cell-specific information shared by all UEs in a cell.

The gNB 2a-10 supporting SUL may provide a first threshold value used to determine an uplink for attempting random access, to the UEs in the cell by using the system information. The UE 2a-05 supporting SUL may calculate a reference signal received power (RSRP) by measuring a sync signal block (SSB) broadcasted by the gNB 2a-10 on a downlink, and compare the RSRP to the first threshold value.

When a measured downlink channel quality is lower than the first threshold value, the UE 2a-05 may select the SUL frequency as the uplink for attempting random access (2a-20). Otherwise, the UE 2a-05 may perform random access at the NR uplink frequency.

The UE 2a-05 may transmit a preamble on the selected uplink (2a-25). The gNB 2a-10 having successfully received the preamble may transmit a random access response (RAR) message to the UE 2a-05 (2a-30). When the NR uplink frequency is used to transmit the preamble and transmission of the preamble fails after a preset number of retransmission attempts, the UE 2a-05 may change the uplink for attempting random access, to the SUL frequency and then re-attempt to transmit the preamble. When transmission of the preamble also fails at the SUL frequency after a preset number of retransmission attempts, the UE 2a-05 may report random access failure to an upper layer, e.g., a non-access stratum (NAS). According to another example, the UE 2a-05 may re-perform the operation of determining the uplink for attempting random access, and attempt random access through the re-determined uplink. Information about whether to additionally attempt random access through another uplink and information about the number of retransmission attempts may be signaled by the gNB 2a-10 by using the system information.

The RAR message includes uplink synchronization information and, when the RAR message is received, the UE 2a-05 may start a timeAlignmentTimer (2a-35). The PAR message may include scheduling information used to transmit a subsequent message, e.g., msg3.

The UE 2a-05 may transmit the msg3 message to the gNB 2a-10 by using a radio resource indicated by the scheduling information (2a-40). The msg3 message may include a radio resource control (RRC) Request message. This message may include a connection request and cause value information indicating a cause of the request.

The gNB 2a-10 having successfully received the msg3 message may transmit a msg4 message to the UE 2a-05 (2a-45). The msg4 message may include a RRC Setup message. The RRC Setup message may include UE-specific configuration information. The configuration information may include PUCCH, PUSCH, and sounding reference symbol (SRS) configuration information about the uplink used for random access. When the uplink used for random access is the SUL frequency, the SUL frequency is regarded as having already been configured for the UE 2a-05, and the gNB 2a-10 provides at least SRS configuration information about the NR uplink frequency to the UE 2a-05. The SRS configuration information about the NR uplink frequency is used to allow the gNB 2a-10 to check a channel status of the NR uplink frequency during data transmission at the SUL frequency. The gNB 2a-10 may provide all types of uplink configuration information about the NR uplink frequency to the UE 2a-05. This is enabled when the NR uplink frequency has a sufficient channel quality, in order to use the two uplink frequencies in turn through layer 1 (L1) signaling. Therefore, there may be two methods of using SUL.

According to a first method of using SUL, all types of uplink configuration information may be provided on an uplink and both PUCCH and PUSCH data may be transmitted on the uplink. Only SRS configuration information may be provided on another uplink and a channel quality status thereof may be monitored. When the channel quality status of the other uplink is good, additional configuration information may be provided and PUCCH and PUSCH data may be transmitted on the other uplink.

According to a second method of using SUL, all types of uplink configuration information may be provided on two uplinks and an uplink for PUSCH transmission may be designated through L1 signaling. PUCCH transmission is determined through RRC signaling, and PUCCH and PUSCH data does not always need to be transmitted on the same uplink. However, a default uplink for PUSCH transmission is the same as an uplink for PUCCH transmission.

In response to the RRC Setup message, the UE 2a-05 may transmit a RRC Setup Complete message to the gNB 2a-10 (2a-50). The RRC Setup Complete message may include a NAS container. When the UE 2a-05 has data to be transmitted to a core network (e.g., an AMF), the UE 2a-05 may transmit the data by using the NAS container. The AMF having received the information may report capability information of the UE 2a-05 to the gNB 2a-10. The capability information is collected by the AMF from the UE 2a-05 at a previous access. At an initial access, the AMF may not have the capability information of the UE 2a-05.

Therefore, in this case, the gNB 2a-10 requests the capability information from the UE 2a-05 (2a-55). The gNB 2a-10 may forward, to the AMF, the capability information reported from the UE 2a-05. The capability information may include information indicating whether the UE 2a-05 supports SUL, and SUL-supportable frequency range or frequency band information. Although the gNB 2a-10 supports SUL function, when a SUL frequency does not belong to a frequency range or frequency band supported by the UE 2a-05, the gNB 2a-10 may regard the UE 2a-05 as not supporting SUL.

The gNB 2a-10 may transmit a SUL-related RRC signal for the following purposes (2a-60).

First, when a SUL frequency is not yet configured, a RRC signal may be transmitted to configure the SUL frequency. In this case, according to the first or second method of using SUL, all types of uplink configuration information may be provided or at least SRS configuration information may be provided at the SUL frequency. In general, the uplink configuration information includes RACH, PUSCH, PUCCH, and SRS configuration information, physical layer configuration information such as antenna, channel quality information (CQI), and power control information, media access control (MAC) layer configuration information, radio bearer setup information, etc.

Second, a RRC signal may be transmitted to change an uplink for PUCCH transmission. The uplink for PUCCH transmission is an uplink used for random access by default. The gNB 2a-10 may change the uplink for PUCCH transmission, by using the RRC signal. Uplink configuration information about the uplink for PUCCH transmission is provided to the UE 2a-05 in advance or simultaneously with a change of PUCCH.

Third, a RRC signal may be transmitted to release a SUL operation. When the SUL operation is released, the UE 2a-05 removes all types of configuration information of the SUL frequency. The gNB 2a-10 may release an uplink while maintaining the SUL operation. For example, the gNB 2a-10 which uses the second method of using SUL may be switched to the first method of using SUL. In this case, the UE 2a-05 removes configuration information of the released uplink but retains SRS configuration information.

The gNB 2a-10 may instruct the UE 2a-05 to perform random access through a certain uplink, by using a physical downlink control channel (PDCCH) order (2a-65) or after certain RRC signaling in order to provide a timing for uplink synchronization or configuration information application.

Two uplinks may be configured in a SUL operation and different timerAlignmentTimers may be configured for the uplinks (2a-70). A timer may be started or re-started in a random access operation or when uplink synchronization information of a Timing Advance Command MAC Control Element (TAC MAC CE) is received. The UE 2a-05 regards uplink synchronization as having been achieved, until the timer is expired. When the timer is expired, the UE 2a-05 regards uplink synchronization as having not been achieved. Therefore, before the timer is expired, random access is performed again or a TAC MAC CE is received. According to another method, although two uplinks are configured, only one timerAlignmentTimer may be used and a criterion for (re)starting the timer is changed. For example, when a new uplink is configured, the gNB 2a-10 may give an instruction to perform random access or may provide a TAC MAC CE for synchronization through the new uplink. In this case, the timer may be restarted.

When a single gNB 2a-10 uses a NR uplink frequency and a SUL frequency, synchronizations of the two uplinks may be equal or very similar. Therefore, the gNB 2a-10 may provide, to the UE 2a-05, information indicating whether individual uplink synchronization processes are used. For example, when a single timerAlignmentTimer is configured, the synchronizations of the two uplinks are regarded as being equal. Otherwise, when individual timerAlignmentTimers are configured for the uplinks, the synchronizations of the two uplinks are regarded as being different and thus individual synchronization processes are used.

In the second method of using SUL, when the gNB 2a-10 decides to switch an uplink (2a-75), the gNB 2a-10 may transmit a L1 signal to the UE 2a-05 (2a-80). The UE 2a-05 having received the L1 signal may transmit PUSCH data on an uplink indicated by the L1 signal (2a-85).

FIG. 2B is a flowchart illustrating a UE operation for configuring an additional uplink frequency, according to an embodiment.

In operation 2b-05, a UE may receive system information from a gNB. The system information may include serving-CellConfigCommon IE. The IE may include configuration information about a NR uplink frequency and a SUL frequency.

In operation 2b-10, when a measured downlink channel quality (e.g., Down Link RSRP) is lower than a first threshold value, the UE may select the SUL frequency as an uplink for attempting random access. Otherwise, the UE may select the NR uplink frequency.

In operation 2b-15, the UE may transmit a preamble on the selected uplink.

In operation 2b-20, the UE may receive a RAR message.

In operation 2b-25, the UE may transmit a Msg3 message including a RRC Request message.

In operation 2b-30, the UE may receive a Msg4 message including a RRC Setup message. The configuration information may include PUCCH, PUSCH, and sounding reference symbol (SRS) configuration information about the uplink used for random access. When the uplink used for random access is the SUL frequency, the SUL frequency is regarded as having already been configured for the UE, and the gNB provides at least SRS configuration information about the NR uplink frequency to the UE.

In operation 2b-35, the UE may transmit a RRC Setup Complete message. The RRC Setup Complete message may include a NAS container. When the UE has data to be transmitted to a core network (e.g., an AMF), the UE may transmit the data by using the NAS container. The AMF having received the information may report capability information of the UE to the gNB.

In operation 2b-40, the UE may report capability information of the UE upon request by the gNB.

In operation 2b-45, the UE may transmit a SUL-related RRC signal for the following purposes.

First, when a SUL frequency is not yet configured, a RRC signal may be transmitted to configure the SUL frequency. Second, a RRC signal may be transmitted to change an uplink for PUCCH transmission. Third, a RRC signal may be transmitted to release a SUL operation.

In operation 2b-50, the UE may perform random access through a certain uplink based on a PDCCH order.

In operation 2b-55, the UE may receive a L1 signal.

In operation 2b-60, the UE may transmit PUSCH data on an uplink indicated by the L1 signal.

Figure 3A:
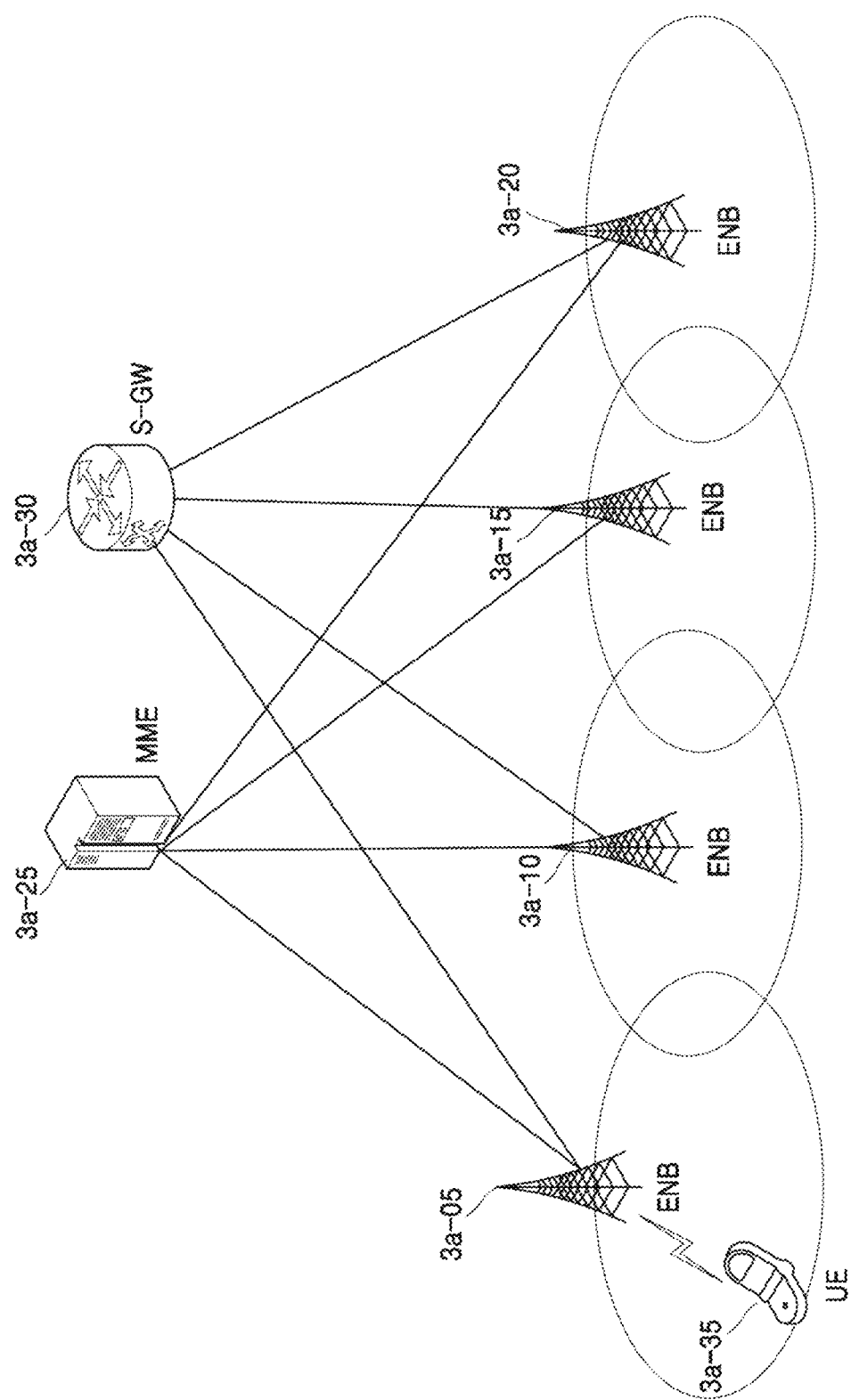
FIG. 3A is a diagram illustrating the structure of a Long Term Evolution (LTE) system to which the present disclosure is applicable.

FIG. 3A is a diagram illustrating the structure of an LTE system to which the present disclosure is applicable.

Referring to FIG. 3A, a radio access network of the LTE system may include evolved nodes B (ENBs) or nodes B 3a-05, 3a-10, 3a-15, and 3a-20, a mobility management entity (MME) 3a-25, and a serving-gateway (S-GW) 3a-30. A user equipment (UE) 3a-35 may access an external network via the ENBs 3a-05, 3a-10, 3a-15, and 3a-20 and the S-GW 3a-30.

In FIG. 3A, each of the ENBs 3a-05, 3a-10, 3a-15, and 3a-20 corresponds to a legacy node B of a universal mobile telecommunications system (UMTS). Each ENB is connected to the UE 3a-35 through radio channels and may perform complex functions compared to a legacy node B. Since all user traffic data including real-time services such as voice over Internet protocol (VoIP) is serviced through shared channels in the LTE system, an apparatus for collating buffer status information of UEs, available Tx power status information, channel status information, etc. and performing scheduling is used and each of the ENBs 3a-05, 3a-10, 3a-15, and 3a-20 may serve as such an apparatus. A single ENB may generally control multiple cells. For example, the LTE system may use radio access technology such as orthogonal frequency-division multiplexing (OFDM) at a bandwidth of 20 MHz to achieve a data rate of 100 Mbps. The LTE system may also use adaptive modulation & coding (AMC) to determine a modulation scheme and a channel coding rate in accordance with a channel status of the UE 3a-35. The S-GW 3a-30 is an apparatus for providing data bearers and may configure or release the data bearers under the control of the MME 3a-25. The MME 3a-25 is an apparatus for performing a mobility management function and various control functions for the UE 3a-35 and may be connected to the ENBs 3a-05, 3a-10, 3a-15, and 3a-20.

Figure 3B:
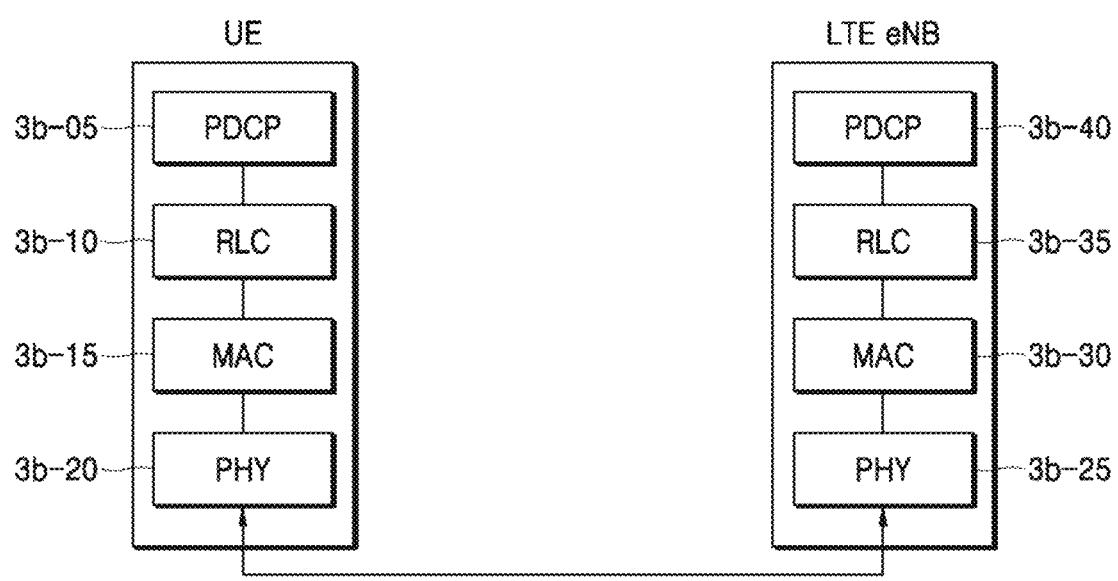
FIG. 3B is a diagram illustrating a radio protocol architecture of an LTE system to which the present disclosure is applicable.

FIG. 3B is a diagram illustrating a radio protocol architecture of an LTE system to which the present disclosure is applicable.

Referring to FIG. 3B, the radio protocol architecture of the LTE system may include packet data convergence protocol (PDCP) layers 3b-05 and 3b-40, radio link control (RLC) layers 3b-10 and 3b-35, and media access control (MAC) layers 3b-15 and 3b-30 respectively for a UE and an eNB. The PDCP layer 3b-05 or 3b-40 is in charge of IP header compression/decompression, etc. Main functions of the PDCP layer 3b-05 or 3b-40 are summarized below.

Header compression and decompression: robust header compression (ROHC) only

Transfer of user data

In-sequence delivery of upper layer packet data units (PDUs) at PDCP re-establishment procedure for RLC AM (Acknowledged Mode)

For split bearers in DC (only support for RLC AM): PDCP PDU routing for transmission and PDCP PDU reordering for reception Duplicate detection of lower layer SDUs at PDCP re-establishment procedure for RLC AM Retransmission of PDCP SDUs at handover and, for split bearers in DC, of PDCP PDUs at PDCP data-recovery procedure, for RLC AM Ciphering and deciphering Timer-based SDU discard in uplink The RLC layer 3b-10 or 3b-35 may perform, for example, an automatic repeat request (ARQ) operation by reconfiguring PDCP PDUs to an appropriate size. Main functions of the RLC layer 3b-10 or 3b-35 are summarized below.

Transfer of upper layer PDUs

Error Correction through ARQ (only for AM data transfer)

Concatenation, segmentation and reassembly of RLC SDUs (only for UM and AM data transfer)

Re-segmentation of RLC data PDUs (only for AM data transfer)

Reordering of RLC data PDUs (only for UM and AM data transfer)

Duplicate detection (only for UM and AM data transfer)

Protocol error detection (only for AM data transfer)

RLC SDU discard (only for UM and AM data transfer)

RLC re-establishment

The MAC layer 3b-15 or 3b-30 may be connected to multiple RLC layer apparatuses configured for a single UE and may multiplex RLC PDUs into a MAC PDU and demultiplex the RLC PDUs from the MAC PDU. Main functions of the MAC layer 3b-15 or 3b-30 are summarized below.

Mapping between logical channels and transport channels
 Multiplexing/demultiplexing of MAC SDUs belonging to one or different logical channels into/from transport blocks (TB) delivered to/from the physical layer on transport channels
 Scheduling information reporting
 Error correction through HARQ
 Priority handling between logical channels of one UE
 Priority handling between UEs by means of dynamic scheduling
 MBMS service identification
 Transport format selection
 Padding A physical (PHY) layer 3b-20 or 3b-25 may channel-code and modulate upper layer data into OFDM symbols and transmit the OFDM symbols through a radio channel, or demodulate OFDM symbols received through a radio channel and channel-decode and deliver the OFDM symbols to an upper layer.

Figure 3C:
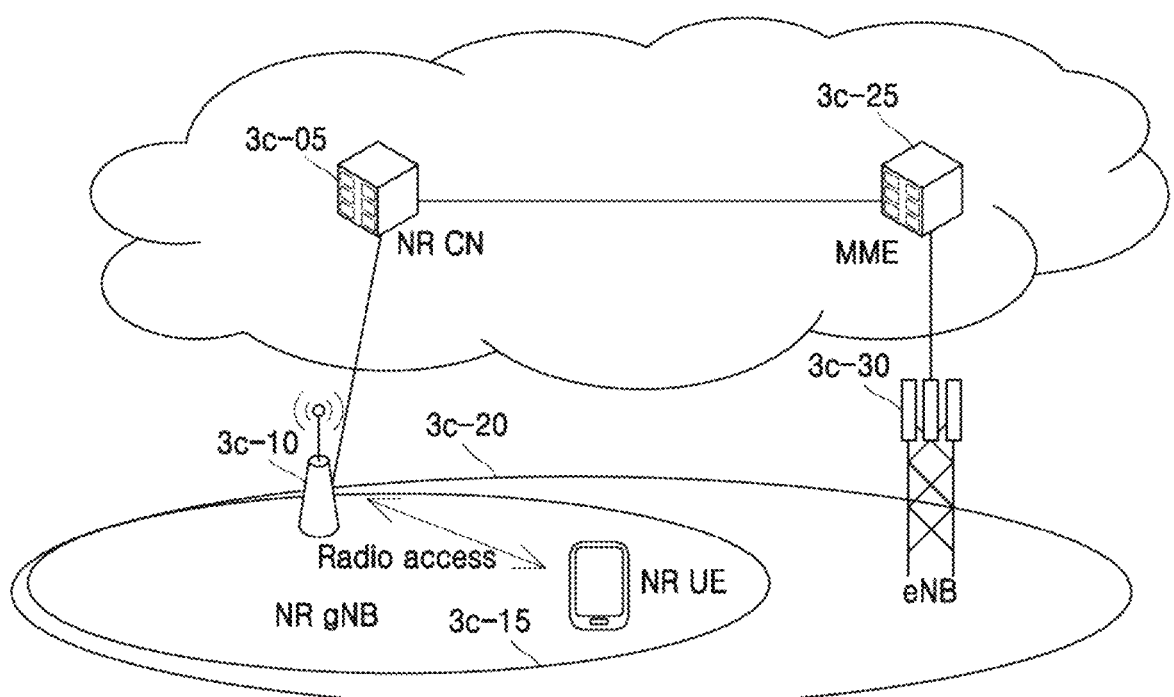
FIG. 3C is a diagram illustrating the structure of a NR system to which the present disclosure is applicable.

FIG. 3C is a diagram illustrating the structure of a NR system to which the present disclosure is applicable.

Referring to FIG. 3C, a radio access network of the NR (or 5G) system may include a new radio node B (NR NB, NR gNB, or gNB) 3c-10 and a new radio core network (NR CN) 3c-05. A new radio user equipment (NR UE) 3c-15 may access an external network via the NR gNB 3c-10 and the NR CN 3c-05.

In FIG. 3C, the NR gNB 3c-10 may correspond to an evolved node B (eNB) of a legacy LTE system. The NR gNB 3c-10 is connected to the NR UE 3c-15 through radio channels and may provide superior services compared to a legacy node B. Since all user traffic data is serviced through shared channels in the NR system, an apparatus for collating buffer status information of UEs, available Tx power status information, channel status information, etc. and performing scheduling is used and the NR gNB 3c-10 may serve as such an apparatus. A single NR gNB may generally control multiple cells.

Currently, a bandwidth greater than the maximum bandwidth of LTE may be given to achieve an ultrahigh data rate, and beamforming technology may be added to radio access technology such as orthogonal frequency-division multiplexing (OFDM). Adaptive modulation & coding (AMC) may also be used to determine a modulation scheme and a channel coding rate in accordance with a channel status of the NR UE 3c-15. The NR CN 3c-05 may perform functions such as mobility support, bearer setup, and quality of service (QoS) setup. The NR CN 3c-05 is an apparatus for performing a mobility management function and various control functions for the NR UE 3c-15 and may be connected to multiple gNBs. The NR system may cooperate with the legacy LTE system, and the NR CN 3c-05 may be connected to a mobility management entity (MME) 3c-25 through a network interface. The MME 3c-25 may be connected to a legacy eNB 3c-30.

Figure 3D:
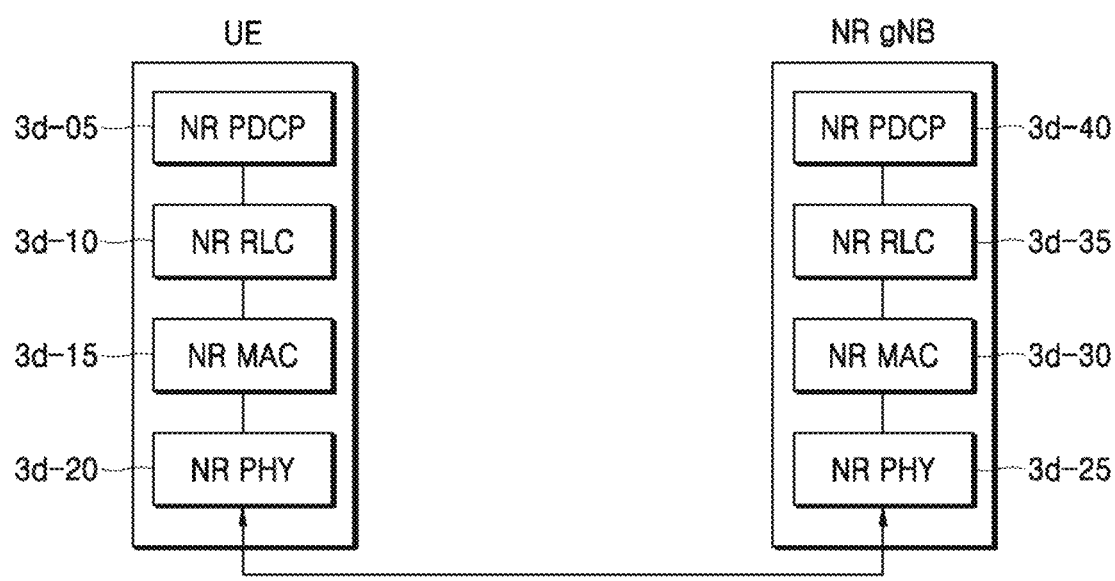
FIG. 3D is a diagram illustrating a radio protocol architecture of a NR system to which the present disclosure is applicable.

FIG. 3D is a diagram illustrating a radio protocol architecture of a NR system to which the present disclosure is applicable.

Referring to FIG. 3D, the radio protocol architecture of the NR system may include NR PDCP layers 3d-05 and 3d-40, NR RLC layers 3d-10 and 3d-35, NR MAC layers 3d-15 and 3d-30 respectively for a UE and a NR eNB.

Main functions of the NR PDCP layer 3d-05 or 3d-40 may include some of the following functions.

Header compression and decompression: ROHC only
 Transfer of user data
 In-sequence delivery of upper layer PDUs
 Out-of-sequence delivery of upper layer PDUs
 PDCP PDU reordering for reception
 Duplicate detection of lower layer SDUs
 Retransmission of PDCP SDUs
 Ciphering and deciphering
 Timer-based SDU discard in uplink The reordering function of the NR PDCP layer apparatus 3d-05 or 3d-40 refers to a function of reordering PDCP PDUs received from a lower layer, on a PDCP sequence number (SN) basis and may include a function of delivering the reordered data to an upper layer in order or out of order, a function of recording lost PDCP PDUs by reordering the PDCP PDUs, a function of reporting status information of the lost PDCP PDUs to a transmitter, and a function of requesting to retransmit the lost PDCP PDUs.

Main functions of the NR RLC layer 3d-10 or 3d-35 may include at least some of the following functions.

Transfer of upper layer PDUs
 In-sequence delivery of upper layer PDUs
 Out-of-sequence delivery of upper layer PDUs
 Error Correction through ARQ
 Concatenation, segmentation and reassembly of RLC SDUs
 Re-segmentation of RLC data PDUs
 Reordering of RLC data PDUs
 Duplicate detection
 Protocol error detection
 RLC SDU discard
 RLC re-establishment The in-sequence delivery function of the NR RLC layer apparatus 3d-10 or 3d-35 refers to a function of delivering RLC service data units (SDUs) received from a lower layer, to an upper layer in order and may include a function of reassembling multiple RLC SDUs segmented from a RLC SDU and delivering the RLC SDU when the segmented RLC SDUs are received. The in-sequence delivery function may include at least one of a function of reordering received RLC PDUs on a RLC SN or PDCP SN basis, a function of recording lost RLC PDUs by reordering the RLC PDUs, and a function of reporting status information of the lost RLC PDUs to a transmitter. The in-sequence delivery function may include a function of requesting to retransmit the lost RLC PDUs and a function of delivering only RLC SDUs previous to a lost RLC SDU, to the upper layer in order, when the lost RLC SDU exists. The in-sequence delivery function may include a function of delivering all RLC SDUs received before a timer is started, to the upper layer in order, although a lost RLC SDU exists, when a certain timer is expired, or a function of delivering all RLC SDUs received up to a current time, to the upper layer in order, although a lost RLC SDU exists, when a certain timer is expired.

The NR RLC layer apparatus 3d-10 or 3d-35 may process the RLC PDUs in order of reception (in order of arrival regardless of sequence numbers) and deliver the RLC PDUs to a PDCP layer apparatus out of order (out-of sequence delivery), and reassemble segments received or stored in a buffer, into a whole RLC PDU and process and deliver the RLC PDU to the PDCP layer apparatus. The NR RLC layer apparatus 3d-10 or 3d-35 may not have a concatenation function, and the concatenation function may be performed by the NR MAC layer apparatus 3d-15 or 3d-30 or be replaced with a multiplexing function of the NR MAC layer apparatus 3d-15 or 3d-30.

The out-of-sequence delivery function of the NR RLC layer apparatus 3d-10 or 3d-35 may refer to a function of delivering the RLC SDUs received from the lower layer to the upper layer, out of order. The out-of-sequence delivery function may include a function of reassembling multiple RLC SDUs segmented from a RLC SDU and delivering the RLC SDU when the segmented RLC SDUs are received. The out-of-sequence delivery function may include a function of storing RLC SNs or PDCP SNs of received RLC PDUs and recording lost RLC PDUs by ordering the RLC PDUs.

The NR MAC layer apparatus 3d-15 or 3d-30 may be connected to multiple NR RLC layer apparatuses configured for a single UE, and main functions of the NR MAC layer apparatus 3d-15 or 3d-30 may include at least some of the following functions.

Mapping between logical channels and transport channels
Multiplexing/demultiplexing of MAC SDUs
Scheduling information reporting
Error correction through HARQ
Priority handling between logical channels of one UE
Priority handling between UEs by means of dynamic scheduling
MBMS service identification
Transport format selection
Padding A NR PHY layer apparatus 3d-20 or 3d-25 may channel-code and modulate upper layer data into OFDM symbols and transmit the OFDM symbols through a radio channel. The NR PHY layer apparatus 3d-20 or 3d-25 may demodulate OFDM symbols received through a radio channel and channel-decode and deliver the OFDM symbols to an upper layer.

The present disclosure proposes a procedure in which a UE compresses uplink data and a gNB decompresses the data in a wireless communication system, and a method of solving decompression failure, e.g., a method of supporting a data transception procedure in which a transmitter compresses data and a receiver decompresses the data. The method proposed by the present disclosure may also be applied to a procedure in which a gNB compresses downlink data directed to a UE and the UE receives and decompresses the compressed downlink data. As described above, since a transmitter transmits compressed data, more data may be transmitted and coverage may be improved.

In the present disclosure, dual connectivity refers to a technology by which a UE simultaneously accesses a master cell group (MCG) of a master gNB and a secondary cell group (SCG) of a secondary gNB and transmit and receive data to and from the two gNBs. Dual connectivity may be easily extended to multi-connectivity. That is, using multi-connectivity, a UE may simultaneously access a master gNB and multiple secondary gNBs and transmit and receive data to and from the gNBs, or may simultaneously access multiple master gNBs and multiple secondary gNBs and transmit and receive data to and from the gNBs.

The present disclosure is described in relation to dual connectivity for convenience of explanation and may be easily extended to multi-connectivity.

Figure 3E:
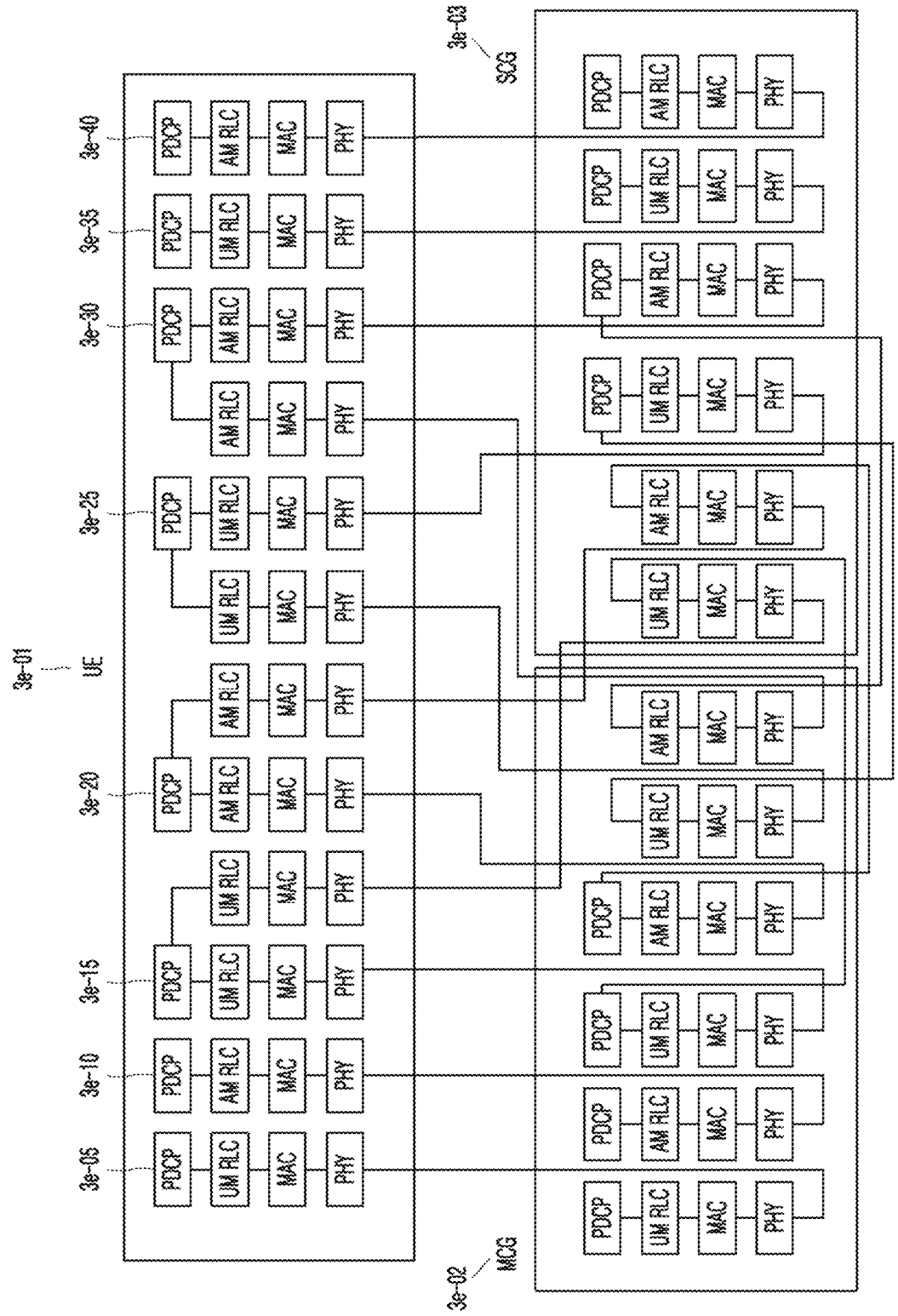
FIG. 3E is a diagram illustrating dual connectivity bearers or multi-connectivity bearers configurable for a UE, to which dual connectivity or multi-connectivity is applied, in a NR system, according to an embodiment.

FIG. 3E is a diagram illustrating dual connectivity bearers or multi-connectivity bearers configurable for a UE 3e-01, to which dual connectivity or multi-connectivity is applied, in a NR system, according to an embodiment.

In FIG. 3E, the UE 3e-01 may be configured to have dual connectivity by a gNB, may be dual-connected to a master gNB 3e-02 and a secondary gNB 3e-03, and may configure various bearers based on bearer setup information or logical channel configuration information configured by the master gNB 3e-02 or the secondary gNB 3e-03. The UE 3e-01 may configure an MCG bearer showing that a RLC layer apparatus operates in a RLC unacknowledged mode (UM) as indicated by 3e-05. The UE 3e-01 may configure an MCG bearer showing that a RLC layer apparatus operates in a RLC acknowledged mode (AM) as indicated by 3e-10, or configure an MCG split bearer showing that a PDCP layer apparatus is in an MCG and RLC layer apparatuses operate in a RLC UM mode as indicated by 3e-15. The UE 3e-01 may configure an MCG split bearer showing that a PDCP layer apparatus is in an MCG and RLC layer apparatuses operate in a RLC AM mode as indicated by 3e-20.

The UE 3e-01 may configure a SCG split bearer showing that a PDCP layer apparatus is in a SCG and RLC layer apparatuses operate in a RLC UM mode as indicated by 3e-25. The UE 3e-01 may configure a SCG split bearer showing that a PDCP layer apparatus is in a SCG and RLC layer apparatuses operate in a RLC AM mode as indicated by 3e-30. The UE 3e-01 may configure a SCG bearer showing that a RLC layer apparatus operates in a RLC UM mode as indicated by 3e-35, or configure a SCG bearer showing that a RLC layer apparatus operates in a RLC AM mode as indicated by 3e-40.

Among the above-described bearers, the MCG or SCG split bearer showing that RLC layer apparatuses operate in a RLC AM mode has a structure useful for high-speed data transmission, and the MCG or SCG split bearer showing that RLC layer apparatuses operate in a RLC UM mode has a structure useful for packet duplication.

Figure 3F:
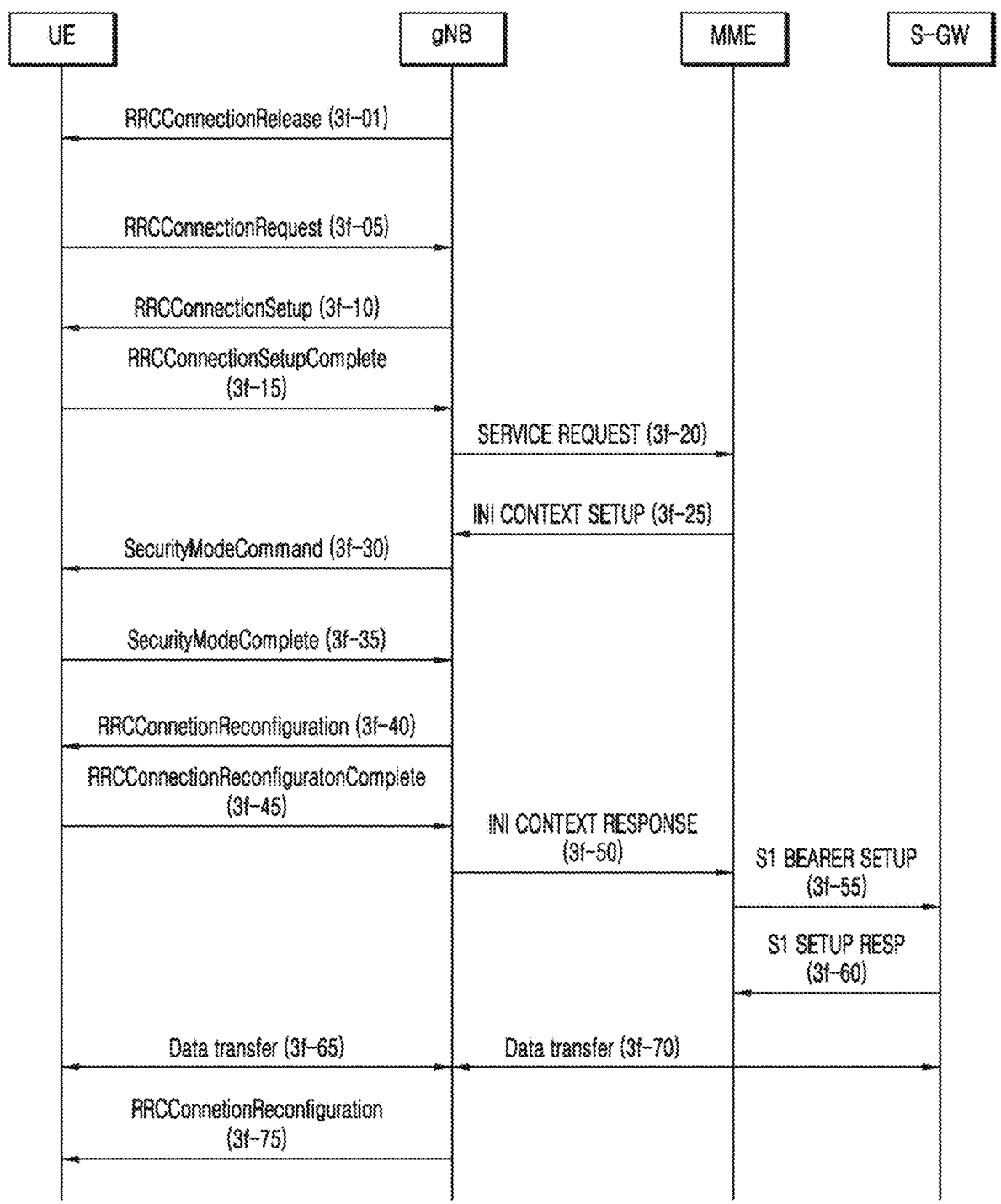
FIG. 3F is a flowchart illustrating a procedure, performed by a next-generation node B (gNB), for configuring one of various bearers described in relation to FIG. 3E, for a UE by using a RRC message and sending a RRC message to release logical channels of the configured bearer when the UE establishes connection, according to an embodiment.

FIG. 3F is a flowchart illustrating a procedure, performed by a gNB, for configuring one of the various bearers described above in relation to FIG. 3E, for a UE by using a RRC message and sending a RRC message to release logical channels of the configured bearer when the UE establishes connection, according to an embodiment.

In FIG. 3F, when the UE for transmitting and receiving data in a RRC connected mode does not perform data transmission or reception due to any reason or for a certain period, the gNB may send a RRCConnectionRelease message to the UE to switch the UE to a RRC idle mode (3f-01). When the UE that has not established a connection with the gNB (hereinafter referred to as an idle mode UE) has data to be transmitted, the UE may perform a RRC connection establishment procedure with the gNB.

The UE may achieve reverse transmission synchronization with the gNB through a random access procedure and transmit a RRCConnectionRequest message to the gNB (3f-05). The RRCConnectionRequest message may include a UE identifier, an establishmentCause, etc.

The gNB may transmit a RRCConnectionSetup message such that the UE establishes a RRC connection (3f-10). The RRCConnectionSetup message may include logical channel configuration information or bearer setup information, and thus, the MCG bearer showing that a RLC layer apparatus operates in a RLC UM mode, the MCG bearer showing that a RLC layer apparatus operates in a RLC AM mode, the MCG split bearer showing that RLC layer apparatuses operate in a RLC AM mode, the MCG split bearer showing that RLC layer apparatuses operate in a RLC UM mode, the SCG bearer showing that a RLC layer apparatus operates in a RLC UM mode, the SCG bearer showing that a RLC layer apparatus operates in a RLC AM mode, the SCG split bearer showing that RLC layer apparatuses operate in a RLC AM mode, or the SCG split bearer showing that RLC layer apparatuses operate in a RLC UM mode, which is described above in relation to FIG. 3E, may be configured for the UE.

The RRCConnectionSetup message may include CellGroupConfig IE containing a CellGroupID and logicalchannel-ToReleaseList information such that the UE may be instructed as to which logical channels of which cell group to release. When the CellGroupID is not included in the CellGroupConfig IE, a master cell group may not be designated. The RRCConnectionSetup message may include a secondary cell group release message containing a SecondaryCellGroupToReleaseList and a CellGroupID and SCG configuration information containing logicalchannel-ToReleaseList information such that the UE may be instructed as to which logical channels of which secondary cell group to release.

The RRCConnectionSetup message may include RRC connection configuration information. A RRC connection may also be called a signaling radio bearer (SRB) and may be used to transmit and receive a RRC message as a control message between the UE and the gNB.

The RRC connected UE may transmit a RRCConnetionSetupComplete message to the gNB (3f-15). When the gNB does not know of or desires to check capability of the currently connected UE, the gNB may send a UE capability inquiry message. The UE may send a UE capability report message. The UE capability report message may include an indicator indicating whether the UE is capable of using uplink data compression (UDC). The RRCConnetionSetupComplete message may include a control message such as a SERVICE REQUEST message for requesting an MME to configure bearers for a certain service by the UE.

The gNB may transmit the SERVICE REQUEST message included in the RRCConnetionSetupComplete message, to the MME (3f-20), and the MME may determine whether to provide the service requested by the UE.

Upon determining to provide the service requested by the UE, the MME may transmit an INITIAL CONTEXT SETUP REQUEST message to the gNB (3f-25). The INITIAL CONTEXT SETUP REQUEST message may include quality of service (QoS) information to be applied to configure data radio bearers (DRBs) and security information to be applied to the DRBs (e.g., a security key or a security algorithm).

The gNB may exchange a SecurityModeCommand message (3f-30) and a SecurityModeComplete message (3f-35) with the UE to configure a security mode. After the security mode is completely configured, the gNB may transmit a RRCConnectionReconfiguration message to the UE (3f-40). The RRCConnectionReconfiguration message may include logical channel configuration information or bearer setup information and thus, the MCG bearer showing that a RLC layer apparatus operates in a RLC UM mode, the MCG bearer showing that a RLC layer apparatus operates in a RLC AM mode, the MCG split bearer showing that RLC layer apparatuses operate in a RLC AM mode, the MCG split bearer showing that RLC layer apparatuses operate in a RLC UM mode, the SCG bearer showing that a RLC layer apparatus operates in a RLC UM mode, the SCG bearer showing that a RLC layer apparatus operates in a RLC AM mode, the SCG split bearer showing that RLC layer apparatuses operate in a RLC AM mode, or the SCG split bearer showing that RLC layer apparatuses operate in a RLC UM mode, which is described above in relation to FIG. 3E, may be configured for the UE.

The RRCConnectionReconfiguration message may include CellGroupConfig IE containing a CellGroupID and logicalchannel-ToReleaseList information such that the UE may be instructed as to which logical channels of which cell group to release. When the CellGroupID is not included in the CellGroupConfig IE, a master cell group may not be designated. The RRCConnectionReconfiguration message may include a secondary cell group release message containing a SecondaryCellGroupToReleaseList and a CellGroupID and SCG configuration information containing logicalchannel-ToReleaseList information such that the UE may be instructed as to which logical channels of which secondary cell group to release.

The RRCConnectionReconfiguration message may include DRB setup information for processing user data and the UE may configure DRBs by using the DRB setup information and transmit a RRCConnectionReconfigurationComplete message to the gNB (3f-45).

The gNB having completely configured the DRBs with the UE may transmit an INITIAL CONTEXT SETUP COMPLETE message to the MME (3f-50) and the MME having received the INITIAL CONTEXT SETUP COMPLETE message may exchange an S1 BEARER SETUP message and an S1 BEARER SETUP RESPONSE message with an S-GW to configure S1 bearers (3f-55 and 3f-60). The S1 bearers are data transmission connections established between the S-GW and the gNB and may correspond to the DRBs one-to-one. When the above-described operations are all completed, the UE may transmit and receive data to and from the gNB and the S-GW (3f-65 and 3f-70). As described above, a general data transmission procedure includes three steps of RRC connection setup, security setup, and DRB setup.

The gNB may transmit a RRCConnectionReconfiguration message to the UE to renew, add, or change the RRC connection due to any reason (3f-75). The RRCConnectionReconfiguration message may include logical channel configuration information or bearer setup information and thus, the MCG bearer showing that a RLC layer apparatus operates in a RLC UM mode, the MCG bearer showing that a RLC layer apparatus operates in a RLC AM mode, the MCG split bearer showing that RLC layer apparatuses operate in a RLC AM mode, the MCG split bearer showing that RLC layer apparatuses operate in a RLC UM mode, the SCG bearer showing that a RLC layer apparatus operates in a RLC UM mode, the SCG bearer showing that a RLC layer apparatus operates in a RLC AM mode, the SCG split bearer showing that RLC layer apparatuses operate in a RLC AM mode, or the SCG split bearer showing that RLC layer apparatuses operate in a RLC UM mode, which is described above in relation to FIG. 3E, may be configured for the UE.

The RRCConnectionReconfiguration message may include CellGroupConfig IE containing a CellGroupID and logicalchannel-ToReleaseList information such that the UE may be instructed as to which logical channels of which cell group to release. When the CellGroupID is not included in the CellGroupConfig IE, a master cell group may not be designated. The RRCConnectionReconfiguration message may include a secondary cell group release message containing a SecondaryCellGroupToReleaseList and a CellGroupID and SCG configuration information containing logicalchannel-ToReleaseList information such that the UE may be instructed as to which logical channels of which secondary cell group to release.

In a NR system according to an embodiment, the gNB may configure, for the UE, the various bearers described above in relation to FIG. 3E by using the RRC message indicated by 3*f*-10, 3*f*-40, or 3*f*-75 in FIG. 3F. The gNB may change types of the bearers configured as described above in relation to FIG. 3E, by using the RRC message indicated by 3*f*-10, 3*f*-40, or 3*f*-75. For example, the bearer type may be changed to the MCG bearer indicated by 3*e*-05 by releasing logical channels (a RLC layer apparatus and a MAC layer apparatus) corresponding to a SCG of the MCG split bearer showing that RLC layer apparatuses operate in a RLC UM mode as indicated by 3*e*-15, changed to the MCG bearer indicated by 3*e*-10 by releasing logical channels (a RLC layer apparatus and a MAC layer apparatus) corresponding to a SCG of the MCG split bearer showing that RLC layer apparatuses operate in a RLC AM mode as indicated by 3*e*-20, changed to the SCG bearer indicated by 3*e*-35 by releasing logical channels (a RLC layer apparatus and a MAC layer apparatus) corresponding to a MCG of the SCG split bearer showing that RLC layer apparatuses operate in a RLC UM mode as indicated by 3*e*-25, or changed to the SCG bearer indicated by 3*e*-40 by releasing logical channels (a RLC layer apparatus and a MAC layer apparatus) corresponding to a MCG of the SCG split bearer showing that RLC layer apparatuses operate in a RLC AM mode as indicated by 3*e*-30.

The present disclosure proposes a method of releasing a logical channel of a bearer in an NR system.

An embodiment for releasing a logical channel of a bearer in the present disclosure is as described below.

A gNB may instruct a UE as to which logical channel of which cell group to release, by using the RRC message indicated by 3*f*-10, 3*f*-40, or 3*f*-75 in FIG. 3F and including CellGroupConfig IE containing a CellGroupID and logicalchannel-ToReleaseList information. When the CellGroupID is not included in the CellGroupConfig IE, a master cell group may not be designated. When instructed by the gNB as to which logical channel of which bearer of which cell group to release, the UE may perform a logical channel release procedure on the instructed logical channel.

Logical Channel Release Method based on Cell Group Configuration

The network configures the UE with a Master Cell Group (MCG) and zero or one or more Secondary Cell Groups (SCG). For EN-DC, the MSG is configured as specified in TS 36.331. The network provides the configuration parameters for a cell group in the CellGroupsConfig IE. If the CellGroupConfig does not contain the cellGroupId, the CellGroupConfig applies for the MCG. Otherwise, the CellGroupConfig applies for an SCG.
  if the CellGroupConfig contains the logicalChannel-ToReleaseList:
  perform Logical Channel Release An embodiment for releasing a logical channel of a bearer in the present disclosure is as described below.

A gNB may instruct a UE as to which logical channel of which secondary cell group to release, by using the RRC message indicated by 3*f*-10, 3*f*-40, or 3*f*-75 in FIG. 3F and including a secondary cell group release message containing a SecondaryCellGroupToReleaseList and a CellGroupID and SCG configuration information containing logicalchannel-ToReleaseList information. When instructed by the gNB as to which logical channel of which bearer of which cell group to release, the UE may perform a logical channel release procedure on the instructed logical channel.

Logical Channel Release Method based on Secondary Cell Group Release

The UE shall
  for each CellGroupId in the SecondaryCellGroupToReleaseList:

reset SCG MAC, if configured;
  for each logical channel that is part of the SCG configuration:
    perform logical channel release procedure
  release the entire SCG configuration;

A logical channel release procedure is performed in various embodiments for releasing a logical channel of a bearer. The logical channel release procedure will now be described in detail.

An embodiment of a logical channel release procedure in a NR system according to the present disclosure is as described below.

When UE configuration information including a logicalChannel-ToReleaseList containing a LogicalChannelIdentity is received using the RRC message indicated by 3*f*-10, 3*f*-40, or 3*f*-75 in FIG. 3F, that is, when instructed to release a logical channel is received according to various embodiments for releasing a logical channel of a bearer, a UE may perform the following operations.
  release the RLC entity or entities (includes discarding all pending RLC PDUs and RLC SDUs)
  trigger the associated PDCP entity to perform data recovery
  release the DTCH logical channel Logical Channel Release Procedure
  The UE shall:
  for each LogicalChannelIdentity value included in the logicalChannel-ToReleaseList that is part of the current UE configuration (LCH release), or
  for each LogicalChannelIdentity value that is to be released as the result of full configuration option:
  release the RLC entity or entities (includes discarding all pending RLC PDUs and RLC SDUs);
  trigger the associated PDCP entity to perform data recovery
  release the DTCH logical channel.

An embodiment of a logical channel release procedure in a NR system according to the present disclosure is as described below.

When UE configuration information including a logicalChannel-ToReleaseList containing a LogicalChannelIdentity is received using the RRC message indicated by 3*f*-10, 3*f*-40, or 3*f*-75 in FIG. 3F, that is, when instructed to release a logical channel is received according to various embodiments for releasing a logical channel of a bearer, a UE performs the following operations.
  release the RLC entity or entities (includes discarding all pending RLC PDUs and RLC SDUs)
  if the RLC entity (or RLC entities) is(are) RLC AM entity (or RLC AM entities), trigger the associated PDCP entity to perform data recovery
  release the DTCH logical channel Logical Channel Release Procedure
  The UE shall:
  for each LogicalChannelIdentity value included in the logicalChannel-ToReleaseList that is part of the current UE configuration (LCH release), or
  for each LogicalChannelIdentity value that is to be released as the result of full configuration option:
  release the RLC entity or entities (includes discarding all pending RLC PDUs and RLC SDUs);
  if the RLC entity (or RLC entities) is(are) RLC AM entity (or RLC AM entities), trigger the associated PDCP entity to perform data recovery
  release the DTCH logical channel.

In an embodiment of a logical channel release procedure, when the RLC layer apparatus operates in a RLC UM mode, although data loss occurs, data recovery is not required and thus PDCP data recovery may not be unnecessarily performed. That is, since the RLC UM mode allows data loss and is sensitive to a delay, performing PDCP data recovery only in the RLC AM mode is suitable to satisfy service requirements and is more efficient.

An embodiment of a logical channel release procedure in a NR system according to the present disclosure is as described below.

When UE configuration information including a logicalChannel-ToReleaseList containing a LogicalChannelIdentity is received using the RRC message indicated by 3f-10, 3f-40, or 3f-75 in FIG. 3F, that is, when instructed to release a logical channel is received according to various embodiments for releasing a logical channel of a bearer, a UE may perform the following operations.

release the RLC entity or entities (includes discarding all pending RLC PDUs and RLC SDUs)
    if the RLC entity (or RLC entities) is(are) RLC AM entity (or RLC AM entities) and if the associated PDCP entity is neither released nor re-established, trigger the associated PDCP entity to perform data recovery
    release the DTCH logical channel Logical Channel Release Procedure
  The UE shall:
    for each LogicalChannelIdentity value included in the logicalChannel-ToReleaseList that is part of the current UE configuration (LCH release), or
    for each LogicalChannelIdentity value that is to be released as the result of full configuration option:
    release the RLC entity or entities (includes discarding all pending RLC PDUs and RLC SDUs);
    if the RLC entity (or RLC entities) is(are) RLC AM entity (or RLC AM entities) and if the associated PDCP entity is neither released nor re-established, trigger the associated PDCP entity to perform data recovery
    release the DTCH logical channel.

In an embodiment of a logical channel release procedure, if the RLC layer apparatus operates in a RLC UM mode, although data loss occurs, data recovery is not required and thus PDCP data recovery may not be unnecessarily performed. When the associated PDCP layer apparatus is released or re-established, PDCP data recovery may not be performed. In other words, when the PDCP layer apparatus is released or re-established, since all pending data are discarded and a buffer is initialized, retransmission or data recovery may not be performed. That is, when the associated PDCP layer apparatus is neither released nor re-established and when the RLC AM layer apparatus (or RLC AM layer apparatuses) is released or re-established, PDCP data recovery may not be performed.

A PDCP data recovery procedure is performed in various embodiments of a logical channel release procedure.

The present disclosure proposes an efficient PDCP data recovery procedure in a NR system as described below.

When a PDCP data recovery request for a radio bearer or an associated logical channel, a PDCP layer apparatus of a UE may perform the following operations.

if the radio bearer is configured by upper layers to send a PDCP status report in the uplink (statusReportRequired), compile a status report and submit the status report to lower layers as the first PDCP PDU for the transmission;
    perform retransmission of all the PDCP PDUs previously submitted to re-established or released AM RLC entity in ascending order of the associated COUNT values from the first PDCP PDU for which the successful delivery has not been confirmed by lower layers.

PDCP Data Recovery Procedure
  When upper layers request a PDCP Data Recovery for a radio bearer, the UE shall:
    if the radio bearer is configured by upper layers to send a PDCP status report in the uplink (statusReportRequired), compile a status report and submit the status report to lower layers as the first PDCP PDU for the transmission;
    perform retransmission of all the PDCP PDUs previously submitted to re-established or released AM RLC entity in ascending order of the associated COUNT values from the first PDCP PDU for which the successful delivery has not been confirmed by lower layers.

FIG. 3G is a flowchart illustrating a UE operation when a UE receives a logical channel release request from a gNB, according to an embodiment.

In FIG. 3G, the UE may receive a logical channel release request from the gNB according to, for example, the various embodiments for releasing a logical channel of a bearer (3g-05).

When the logical channel release request is received, the UE may identify which logical channel of which bearer of which cell group to release, and determine whether a RLC layer apparatus corresponding to the logical channel operates in a RLC AM mode and whether a PDCP layer apparatus connected to the logical channel is neither re-established nor released (3g-10).

When the RLC layer apparatus corresponding to the logical channel operates in a RLC AM mode and when the PDCP layer apparatus connected to the logical channel is neither re-established nor released, the PDCP layer apparatus may perform PDCP data recovery (3g-15). Otherwise, the PDCP layer apparatus may not perform PDCP data recovery (3g-20).

The present disclosure proposes a procedure in which a UE compresses uplink data and a gNB decompresses the data in a wireless communication system, a certain header format therefor, and a method of solving decompression failure, e.g., a method of supporting a data transception procedure in which a transmitter compresses data and a receiver decompresses the data. The present disclosure may also be applied to a procedure in which a gNB compresses downlink data directed to a UE and the UE receives and decompresses the compressed downlink data. As described above, since a transmitter transmits compressed data, more data may be transmitted and coverage may be improved.

Figure 4A:
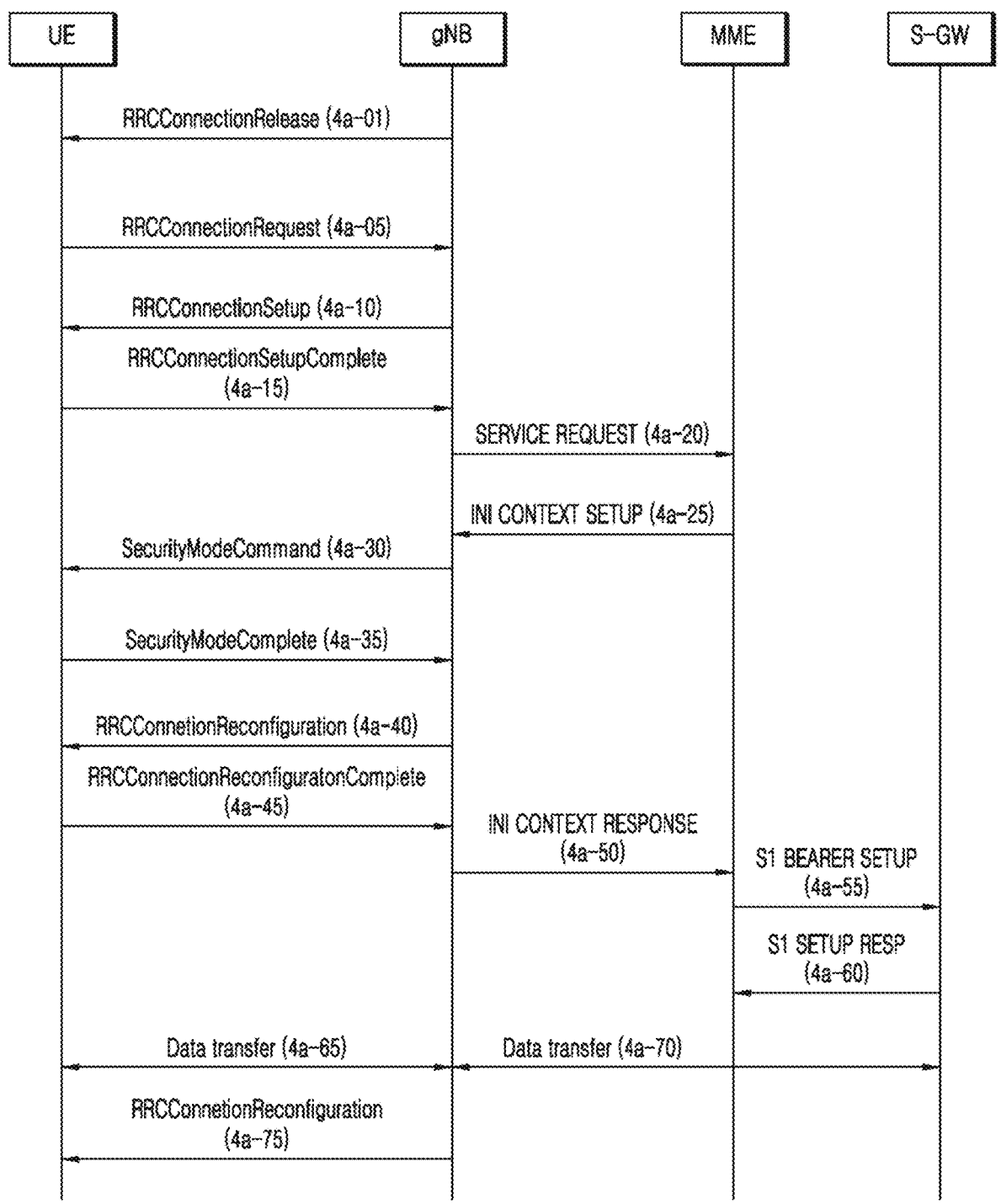
FIG. 4A is a flowchart illustrating a procedure, performed by a gNB, for instructing whether to perform uplink data compression (UDC), when a UE establishes a connection with a network, according to an embodiment.

FIG. 4A is a flowchart illustrating a procedure, performed by a gNB, for instructing whether to perform uplink data compression (UDC), when a UE establishes a connection with a network, according to an embodiment.

FIG. 4A illustrates a procedure in which a gNB requests UDC when a UE in a RRC idle mode or a RRC inactive (or lightly-connected) mode is switched to a RRC connected mode and establishes a connection with a network.

In FIG. 4A, when the UE for transmitting and receiving data in a RRC connected mode does not perform data transmission or reception due to any reason or for a certain period, the gNB may send a RRCConnectionRelease message to the UE to switch the UE to a RRC idle mode (4a-01). When the UE that has not established a connection with the gNB (hereinafter referred to as an idle mode UE) has data to be transmitted, the UE may perform a RRC connection establishment procedure with the gNB.

The UE may achieve reverse transmission synchronization with the gNB through a random access procedure and transmit a RRCConnectionRequest message to the gNB (4a-05). The RRCConnectionRequest message may include a UE identifier, an establishmentCause, etc.

The gNB may transmit a RRCConnectionSetup message such that the UE establishes a RRC connection (4a-10). The RRCConnectionSetup message may include information indicating whether to use UDC per logical channel (LogicalChannelConfig), per bearer, or per PDCP layer apparatus (PDCP-Config). Specifically, the RRCConnectionSetup message may provide information indicating whether to use UDC only for which IP or QoS flow, for each logical channel, bearer, or PDCP layer apparatus (or service data adaptation protocol (SDAP) layer apparatus). As another example, using the RRCConnectionSetup message, information about an IP or QoS flow to use or not to use UDC may be provided to the SDAP layer apparatus such that the SDAP layer apparatus may instruct the PDCP layer apparatus whether to use or not to use UDC for each QoS flow. As another example, through the RRCConnectionSetup message, the PDCP layer apparatus may autonomously check each QoS flow (based on configuration information provided by the gNB) and determine whether to apply or not to apply UDC.

When instructed to use UDC, a pre-defined library or dictionary ID to be used for UDC, a buffer size to be used for UDC, etc. may be provided.

The RRCConnectionSetup message may include an uplink data decompression setup or release command. When configured to use UDC, the UE may be configured with a RLC AM bearer (a lossless mode due to an ARQ function or a retransmission function) and may not be configured with a header compression protocol (e.g., a robust header compression (ROHC) protocol). The RRCConnectionSetup message may include RRC connection configuration information. A RRC connection may also be called a signaling radio bearer (SRB) and may be used to transmit and receive a RRC message as a control message between the UE and the gNB.

The RRC connected UE may transmit a RRCConnetionSetupComplete message to the gNB (4a-15). When the gNB does not know of or desires to check capability of the currently connected UE, the gNB may send a UE capability inquiry message. The UE may send a UE capability report message. The UE capability report message may include an indicator indicating whether the UE is capable of using UDC.

The RRCConnetionSetupComplete message may include a control message such as a SERVICE REQUEST message for requesting an MME to configure bearers for a certain service for the UE. The gNB may transmit the SERVICE REQUEST message included in the RRCConnetionSetupComplete message, to the MME (4a-20), and the MME may determine whether to provide the service requested by the UE.

Upon determining to provide the service requested by the UE, the MME may transmit an INITIAL CONTEXT SETUP REQUEST message to the gNB (4a-25). The INITIAL CONTEXT SETUP REQUEST message may include QoS information to be applied to configure data radio bearers (DRB) and security information to be applied to the DRBs (e.g., a security key or a security algorithm).

The gNB may exchange a SecurityModeCommand message (4a-30) and a SecurityModeComplete message (4a-35) with the UE to configure a security mode. After the security mode is completely configured, the gNB may transmit a RRCConnectionReconfiguration message to the UE (4a-40). The RRCConnectionReconfiguration message may include information indicating whether to use UDC per logical channel (LogicalChannelConfig), per bearer, or per PDCP layer apparatus (PDCP-Config). Specifically, the RRCConnectionReconfiguration message may provide information indicating whether to use UDC only for which IP or QoS flow, for each logical channel, bearer, or PDCP layer apparatus (or service data adaptation protocol (SDAP) layer apparatus). As another example, using the RRCConnectionReconfiguration message, information about an IP or QoS flow to use or not to use UDC may be provided to the SDAP layer apparatus such that the SDAP layer apparatus may instruct the PDCP layer apparatus whether to use or not to use UDC for each QoS flow. As another example, through the RRCConnectionReconfiguration message, the PDCP layer apparatus may autonomously check each QoS flow (based on configuration information provided by the gNB) and determine whether to apply or not to apply UDC.

When instructed to use UDC, a pre-defined library or dictionary ID to be used for UDC, a buffer size to be used for UDC, etc. may be provided. The RRCConnectionReconfiguration message may include an uplink data decompression setup or release command. When configured to use UDC, the UE may be configured with a RLC AM bearer (a lossless mode due to an ARQ function or a retransmission function) and may not be configured with a header compression protocol (e.g., a ROHC protocol). The RRCConnectionReconfiguration message may include DRB setup information for processing user data and the UE may configure DRBs by using the DRB setup information and transmit a RRCConnectionReconfigurationComplete message to the gNB (4a-45).

The gNB having completely configured the DRBs with the UE may transmit an INITIAL CONTEXT SETUP COMPLETE message to the MME (4a-50) and the MME having received the INITIAL CONTEXT SETUP COMPLETE message may exchange an S1 BEARER SETUP message and an S1 BEARER SETUP RESPONSE message with an S-GW to configure S1 bearers (4a-55 and 4a-60). The S1 bearers are data transmission connections established between the S-GW and the gNB and may correspond to the DRBs one-to-one. When the above-described operations are all completed, the UE may transmit and receive data to and from the gNB and the S-GW (4a-65 and 4a-70). As described above, a general data transmission procedure includes three steps of RRC connection setup, security setup, and DRB setup. The gNB may transmit a RRCConnectionReconfiguration message to the UE to renew, add, or change the RRC connection due to any reason (4a-75). The RRCConnectionReconfiguration message may include information indicating whether to use UDC per logical channel (LogicalChannelConfig), per bearer, or per PDCP layer apparatus (PDCP-Config). Specifically, the RRCConnectionReconfiguration message may provide information indicating whether to use UDC only for which IP or QoS flow, for each logical channel, bearer, or PDCP layer apparatus (or service data adaptation protocol (SDAP) layer apparatus). As another example, using the RRCConnectionReconfiguration message, information about an IP or QoS flow to use or not to use UDC may be provided to the SDAP layer apparatus such that the SDAP layer apparatus may instruct the PDCP layer apparatus whether to use or not to use UDC for each QoS flow.

As another example, the PDCP layer apparatus may autonomously check each QoS flow (based on configuration information provided by the gNB) and determine whether to apply or not to apply UDC.

When instructed to use UDC, a pre-defined library or dictionary ID to be used for UDC, a buffer size to be used for UDC, etc. may be provided. The RRCConnectionReconfiguration message may include an uplink data decompression setup or release command. When configured to use UDC, the UE may be configured with a RLC AM bearer (a lossless mode due to an ARQ function or a retransmission function) and may not be configured with a header compression protocol (e.g., a ROHC protocol).

Figure 4B:
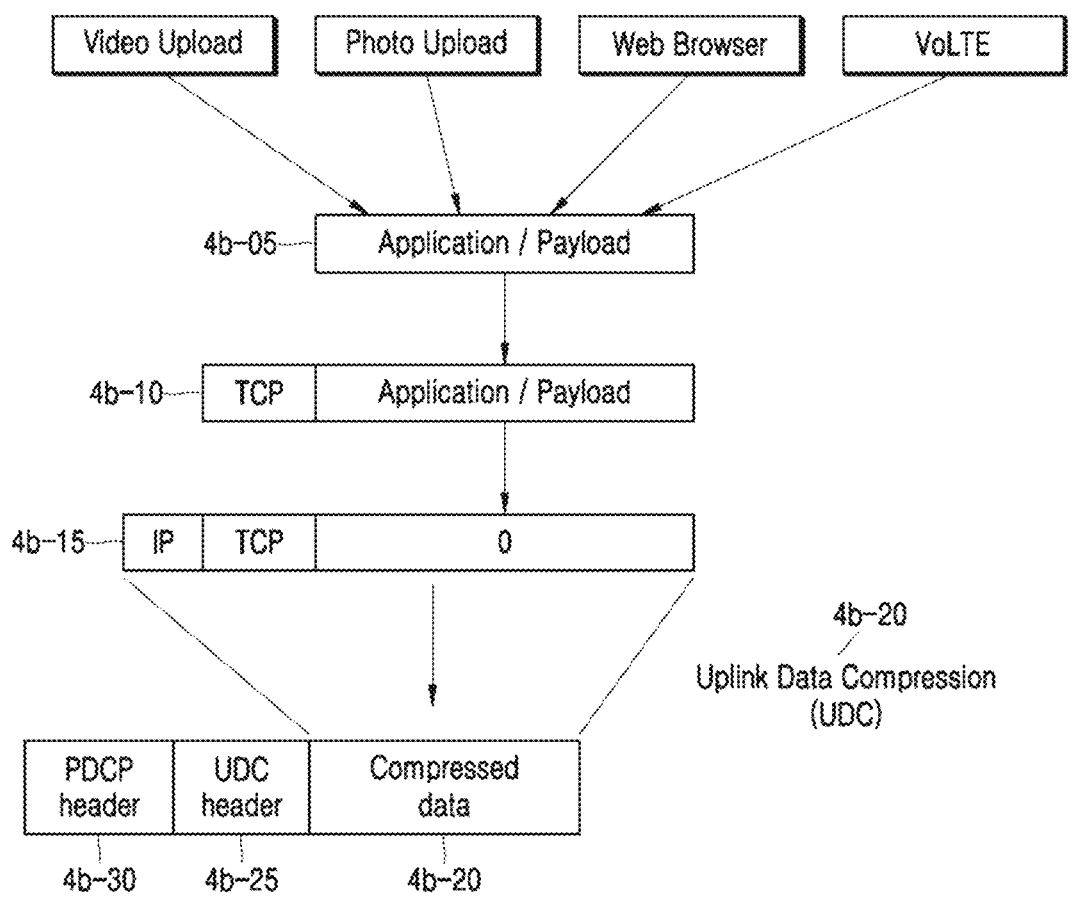
FIG. 4B is a diagram illustrating a procedure and a data configuration for performing UDC, according to an embodiment.

FIG. 4B is a diagram illustrating a procedure and a data configuration for performing UDC, according to an embodiment.

In FIG. 4B, uplink data 4b-05 may include data corresponding to services such as video upload, photo upload, web browser, and voice over LTE (VoLTE). Data generated by an application layer apparatus may be processed by a network data transmission layer such as a TCP/IP or UDP layer to configure headers 4b-10 and 4b-15 and may be delivered to a PDCP layer apparatus. When a PDCP SDU is received from an upper layer, the PDCP layer apparatus may perform the following operations.

When the RRC message indicated by 4a-10, 4a-40, or 4a-75 in FIG. 4A indicates to use UDC for the PDCP layer apparatus, the PDCP layer apparatus may perform UDC on the PDCP SDU as indicated by 4b-20 to compress the uplink data, configure a UDC header (a header for the compressed uplink data 4b-20) 4b-25, perform ciphering, perform integrity protection when configured, and configure a PDCP header 4b-30, thereby generating a PDCP PDU. The PDCP layer apparatus includes a UDC compression/decompression layer apparatus and may determine whether to perform UDC on each data unit as indicated by the RRC message and use the UDC compression/decompression layer apparatus. In a transmitter, a Tx PDCP layer apparatus may perform data compression by using a UDC compression layer apparatus and, in a receiver, a Rx PDCP layer apparatus may perform data decompression by using a UDC decompression layer apparatus.

The above-described procedure of FIG. 4B may be used not only to compress the uplink data by a UE but also to compress downlink data. The above description related to the uplink data may be equally applied to the downlink data.

Figure 4C:
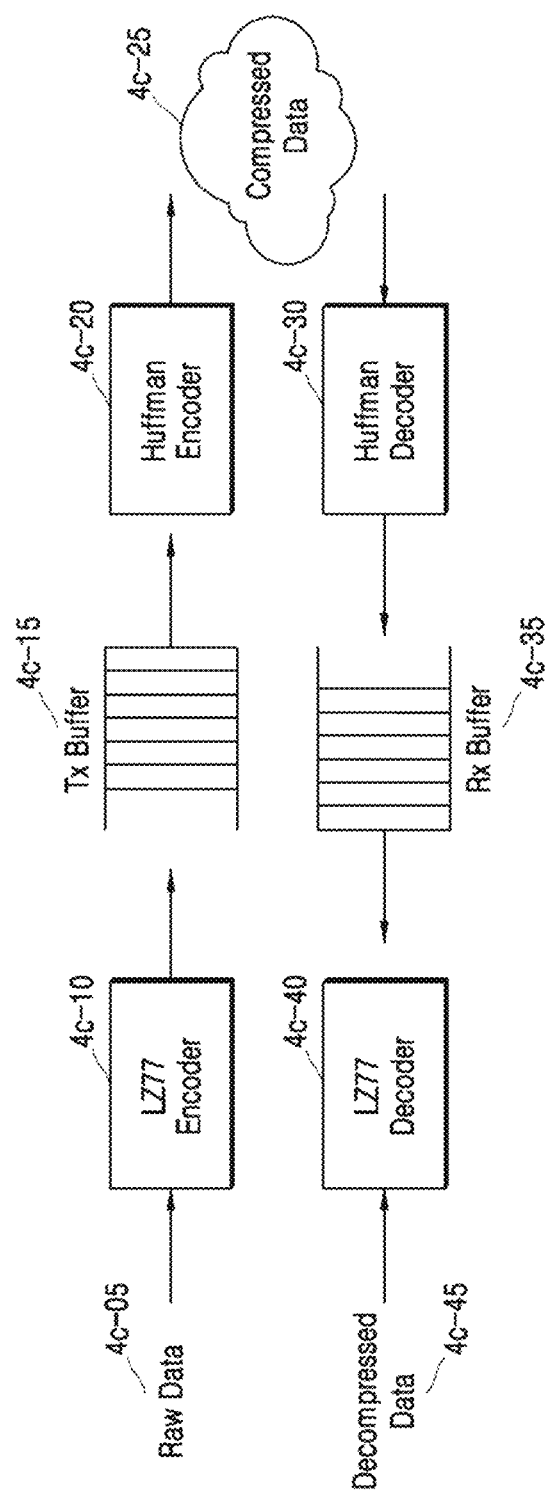
FIG. 4C is a diagram illustrating a UDC method according to an embodiment.

FIG. 4C is a diagram illustrating a UDC method according to an embodiment.

FIG. 4C illustrates a DEFLATE-based UDC algorithm which is a lossless compression algorithm. According to the DEFLATE-based UDC algorithm, basically, uplink data may be compressed using a combination of an LZ77 algorithm and Huffman coding algorithm. According to the LZ77 algorithm, an operation of finding repeated occurrences of data within a sliding window is performed, and when the repeated occurrences within the sliding window are found, data compression is performed by expressing the repeated data within the sliding window as a location and length thereof. The sliding window is called a buffer in the UDC method and may be set to 8 kilobytes or 32 kilobytes. That is, the sliding window or the buffer may record 8,192 or 32,768 characters, find repeated occurrences of data, and perform data compression by expressing the repeated data as a location and length thereof. Therefore, since the LZ77 algorithm is a sliding window scheme, that is, since subsequent data is coded immediately after previously coded data is updated in a buffer, successive data may have correlations therebetween.

Thus, the subsequent data may be normally decoded only when the previously coded data is normally decoded. The codes compressed and expressed as the location and length by using the LZ77 algorithm is compressed once again by using the Huffman coding algorithm. According to the Huffman coding algorithm, repeated characters may be found and data compression may be performed once again by assigning the shortest code to the most frequent character and assigning the longest code to the least frequent character. The Huffman coding algorithm is a prefix coding algorithm and is an optimal coding scheme by which all codes are uniquely decodable.

As described above, a transmitter may encode raw data 4c-05 by using the LZ77 algorithm (4c-10), update a buffer 4c-15, and configure a UDC header by generating checksum bits for the content (or data) of the buffer. The checksum bits may be used by a receiver to determine validity of a buffer status. The transmitter may compress the codes encoded using the LZ77 algorithm, by using the Huffman coding algorithm (4c-20), and transmit the compressed data as uplink data (4c-25).

The receiver may perform a decompression procedure on the compressed data received from the transmitter, in an inverse manner to that of the transmitter. That is, the receiver may perform Huffman decoding (4c-30), update a buffer (4c-35), and check validity of the updated buffer, based on the checksum bits of the UDC header. Upon determining that the checksum bits have no error, the receiver may decompress the data by performing decoding using the LZ77 algorithm (4c-40) to reconstruct the raw data and deliver the decompressed data to an upper layer (4c-45).

As described above, since the LZ77 algorithm is a sliding window scheme, that is, since subsequent data is coded immediately after previously coded data is updated in a buffer, successive data may have correlations therebetween. Thus, the subsequent data may be normally decoded only when the previously coded data is normally decoded. Therefore, a Rx PDCP layer apparatus may check PDCP sequence numbers of a PDCP header, check a UDC header (check an indicator indicating whether data compression is or is not performed), and decompress compressed UDC data in ascending order of the PDCP sequence numbers.

A procedure for configuring UDC for a UE by a gNB and a procedure for performing UDC by the UE are as described below.

The gNB may configure or release UDC for a bearer or a logical channel which configures a RLC AM mode for the UE, by using the RRC message indicated by 4a-10, 4a-40, or 4a-75 in FIG. 4A. The gNB may reset a UDC apparatus (or protocol) of a PDCP layer apparatus of the UE, by using the RRC message. Resetting the UDC apparatus (or protocol) means that a UDC buffer for uplink data compression of the UE is reset, and is used to achieve synchronization between the UDC buffer of the UE and a UDC buffer for uplink data decompression of the gNB. To reset the buffer of the UDC apparatus, an existing PDCP control PDU may be modified or a new PDCP control PDU may be defined and a transmitter (gNB) may reset a UDC buffer of a receiver (UE) by using the PDCP control PDU instead of the RRC message to achieve synchronization for user data compression and decompression between the transmitter and the receiver.

Using the RRC message, whether to perform uplink data compression may be determined per bearer, per logical channel, or per PDCP layer apparatus. Specifically, whether to perform or not to perform uplink data decompression may be configured per IP (or QoS) flow in each bearer, logical channel, or PDCP layer apparatus.

For the configuration per QoS flow, the PDCP layer apparatus may configure an indicator or information to indicate for which QoS flow to perform uplink data decompression and for which QoS flow not to perform uplink data decompression. The configuration per QoS flow may be provided to a SDAP layer apparatus other than the PDCP layer apparatus such that the SDAP layer apparatus may instruct the PDCP layer apparatus whether to perform or not to perform uplink data decompression for each QoS flow when the QoS flow is mapped to a bearer.

Using the RRC message, the gNB may configure a PDCP discard timer value for the UE. In this case, for the PDCP discard timer value, a PDCP discard timer value for data to which UDC is not applied and a PDCP discard timer value for data to which UDC is applied may be separately configured.

When configured to perform UDC for a certain bearer, logical channel, or PDCP layer apparatus (or for any QoS flows of the certain bearer, logical channel, or PDCP layer apparatus) by using the RRC message, the UE may reset a buffer in a UDC apparatus of the PDCP layer apparatus in accordance with the configuration and prepare a UDC procedure. When a PDCP SDU is received from an upper layer and when configured to perform UDC for the PDCP layer apparatus, the UE may perform UDC on the received PDCP SDU.

When configured to perform UDC only for certain QoS flows of the PDCP layer apparatus, the UE may determine whether to perform UDC by checking an instruction of an upper SDAP layer or QoS flow identities, and perform UDC. When UDC is performed and the buffer is updated in accordance with the UDC compression, the UE may configure a UDC buffer. When UDC is performed, the PDCP SDU received from the upper layer may be compressed into UDC data (e.g., a UDC block) having a smaller size.

The UE may configure a UDC header for the compressed UDC data. The UDC header may include an indicator indicating whether UDC is or is not performed. For example, a 1-bit indicator of the UDC header may have a value 0 indicating that UDC is applied, or a value 1 indicating that UDC is not applied.

UDC may not be applied because an upper layer (e.g., an application layer) has already performed data compression such that, although the PDCP layer apparatus performs UDC, a very low compression ratio may be obtained and processing load of a transmitter may unnecessarily increase due to the compression procedure, or because the PDCP SDU received from the upper layer does not have a repeated data structure and thus may not be compressed using the UDC method (e.g., the DEFLATE algorithm).

When UDC is performed on the PDCP SDU received from the upper layer and the UDC buffer is updated, the Rx PDCP layer apparatus may calculate checksum bits and include the calculated checksum bits in the UDC buffer to check validity of the updated UDC buffer. Herein, the checksum bits have a certain length, e.g., 4 bits.

The UE may perform integrity protection on data to which uplink data decompression is applied or not applied, when integrity protection is configured for the data, perform ciphering, and deliver the data to a lower layer.

Figure 4D:
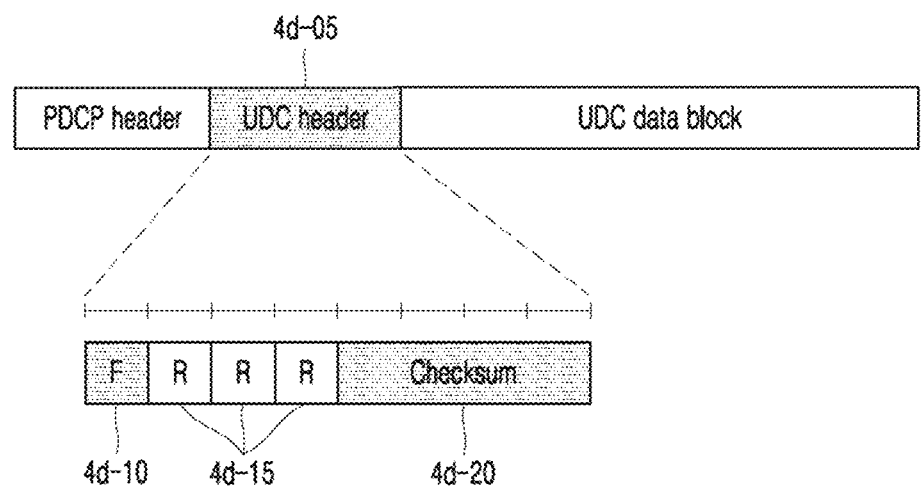
FIG. 4D is a diagram illustrating a UDC header according to an embodiment.

FIG. 4D is a diagram illustrating a UDC header 4d-05 according to an embodiment.

In FIG. 4D, when UDC is applied (when UDC is performed), a PDCP PDU may include a PDCP header, the UDC header 4d-05, and a compressed UDC data block. The UDC header 4d-05 may have a size of 1 byte and may include an F field 4d-10, an R field 4d-15, and checksum bits 4d-20.

In the UDC header 4d-05, the F field 4d-10 is a field indicating whether UDC is applied or not applied to the UDC data block. For example, the F field 4d-10 may indicate whether UDC is performed or not performed. That is, a Tx PDCP layer apparatus may set the F field 4d-10 to be, for example, 1 when a PDCP SDU is received from an upper layer and UDC is applied thereto, and may set the F field 4d-10 to be 0 when UDC is applied thereto. UDC may not be applied because an upper layer (e.g., an application layer) has already performed data compression such that, although the PDCP layer apparatus performs UDC, a very low compression ratio may be obtained and processing load of a transmitter may unnecessarily increase due to the compression procedure. The PDCP layer apparatus may determine whether to apply UDC, by receiving instruction information for each IP or QoS flow from a SDAP layer apparatus, or the PDCP layer apparatus or a UDC apparatus may determine whether to apply UDC to each IP or QoS flow based on configuration information included in a RRC message provided by a gNB.

The R bits 4d-15 of FIG. 4D are reserved bits and may be defined and used to indicate whether to reset a UDC buffer, whether to use current data to update the UDC buffer, or whether to use a pre-defined dictionary.

The checksum bits 4d-20 of FIG. 4D may be used to check validity of the content of a Tx UDC buffer used when a transmitter applies UDC, as described above. When a receiver decompresses compressed UDC data, the receiver may calculate and use checksum bits to check validity of the content of a Rx UDC buffer. The checksum bits 4d-20 may have a length of 4 bits or may have a longer length to increase accuracy of checking validity.

Figure 4E:
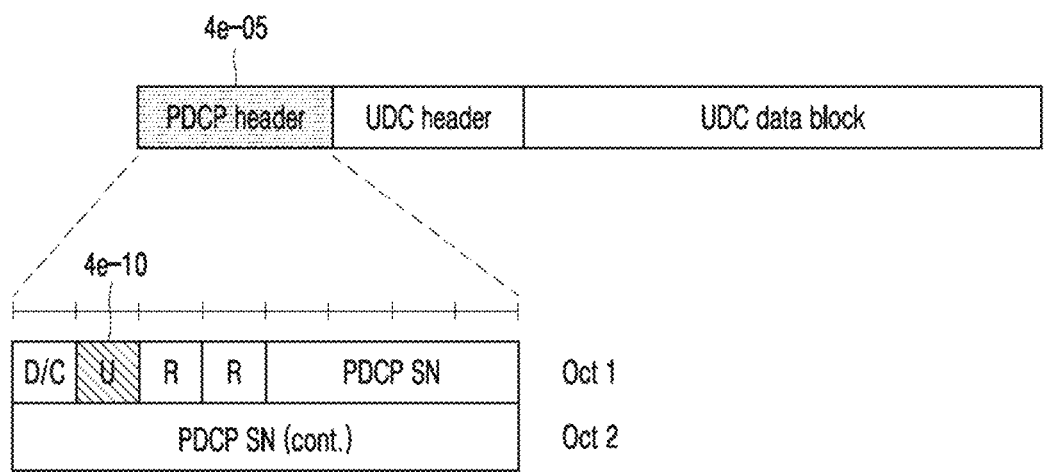
FIGS. 4E and 4F are diagrams illustrating a procedure for defining a new field capable of reducing overhead, in a packet data convergence protocol (PDCP) header and configuring a PDCP packet data unit (PDU) by using the new field, according to embodiments.
Figure 4F:
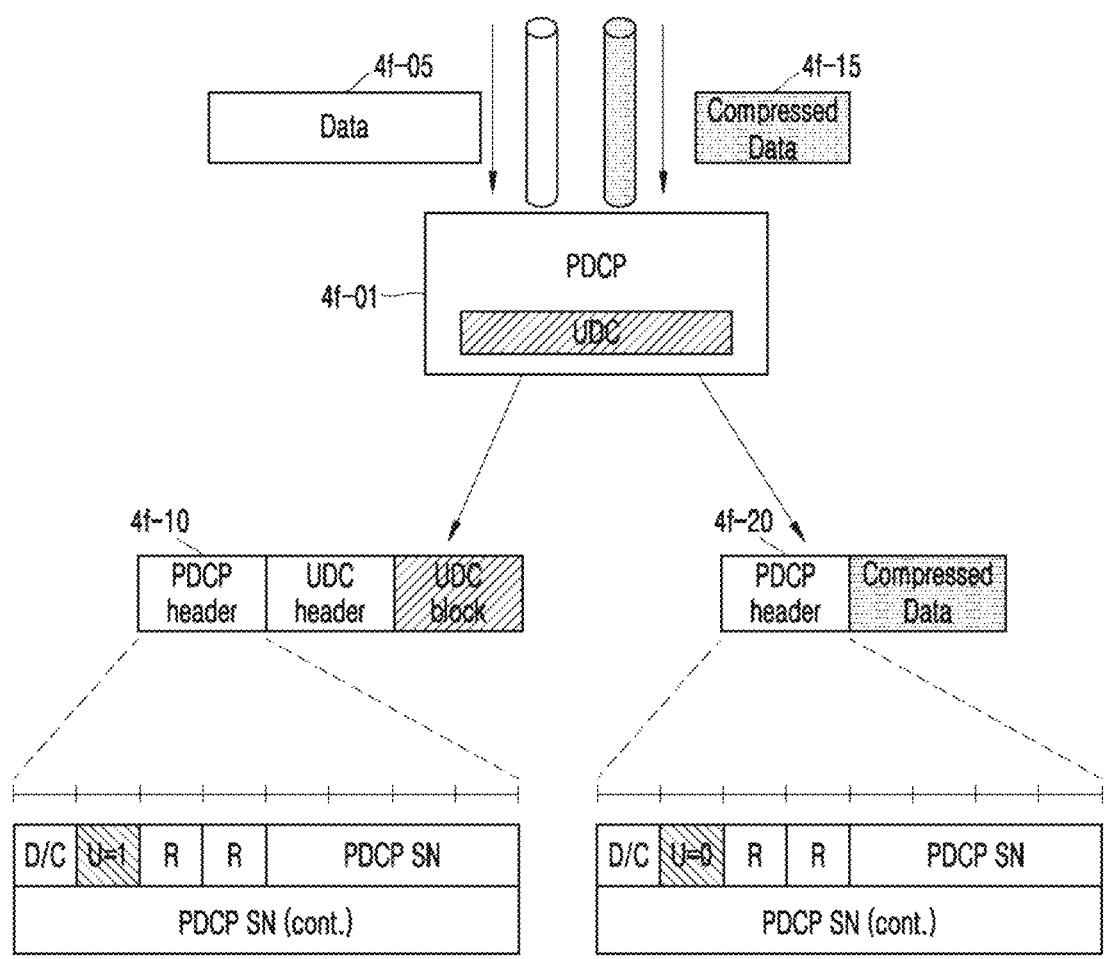

FIGS. 4E and 4F are diagrams illustrating a procedure for defining a new field capable of reducing overhead, in a PDCP header and configuring a PDCP PDU by using the new field, according to embodiments.

As illustrated in FIG. 4E, a new U field 4e-10 may be defined in a PDCP header 4e-05. The U field 4e-10 may indicate whether UDC is applied to a PDCP SDU of the PDCP PDU. The U field 4e-10 may indicate whether a UDC header exists in the PDCP SDU. The reason why a 1-bit indicator of the PDCP header 4e-05 indicates whether UDC is applied and whether a UDC header exists is because, when an upper layer (e.g., an application layer) has already performed data compression, that is, when the upper layer already has a compression function, although a PDCP layer apparatus performs UDC, a very low compression ratio may be obtained and processing load of a transmitter may unnecessarily increase due to the compression procedure.

The PDCP layer apparatus may determine whether to apply UDC, by receiving instruction information for each IP or QoS flow from a SDAP layer apparatus, or the PDCP layer apparatus or a UDC apparatus may determine whether to apply UDC to each IP or QoS flow based on configuration information included in a RRC message provided by a gNB.

In FIG. 4F, when UDC is not applied to upper layer data 4f-15, a Tx PDCP layer apparatus 4f-01 for which UDC is configured may set the U field of a PDCP header 4f-20 to be 0 (or 1) and omit a UDC header. Otherwise, when UDC is applied to upper layer data 4f-05, the Tx PDCP layer apparatus 4f-01 for which UDC is configured may set the U field of a PDCP header 4f-10 to be 1 (or 0) and configure and insert a UDC header. Therefore, when the U field of the PDCP header is set to be 0, a Rx PDCP layer apparatus may determine that no UDC header exists and may omit a UDC process, i.e., uplink data decompression, on the PDCP SDU. Otherwise, when the U field of the PDCP header is set to be 1, the Rx PDCP layer apparatus may determine that a UDC header exists, read the UDC header of the PDCP SDU, check validity of a buffer by using checksum bits of the UDC header, and perform uplink data decompression on the other part of the PDCP SDU to reconstruct raw data.

Therefore, when data is transmitted from a transmitter to a receiver and a PDCP PDU is configured for the PDCP SDU to which UDC is not applied, the 1-bit U field 4e-10 of the PDCP header 4e-05 of FIG. 4E may indicate that no UDC header exists and that UDC is not applied, a UDC header may be omitted, and thus 1-byte overhead may be saved. The U field may be used only when UDC is configured for a bearer, a logical channel, or a PDCP layer apparatus and may be used as a reserved field or another function field when UDC is not configured.

Figure 4G:
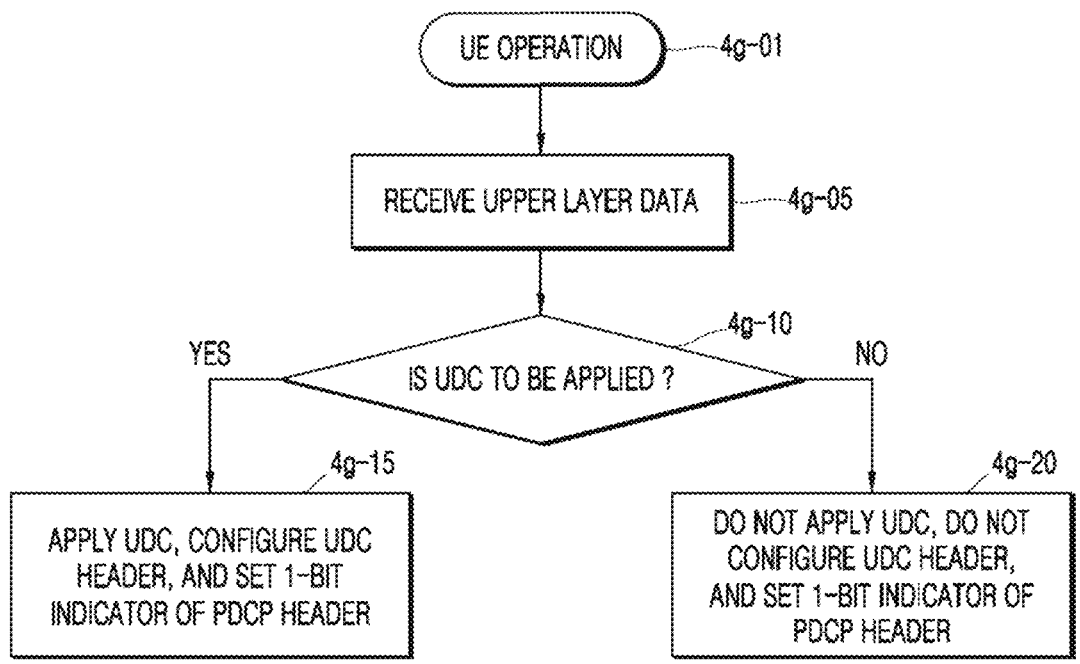
FIG. 4G is a flowchart illustrating a transmitter (UE) operation for performing a UDC method capable of reducing overhead, according to an embodiment.

FIG. 4G is a flowchart illustrating a transmitter (UE) operation for performing a UDC method capable of reducing overhead, according to an embodiment.

In FIG. 4G, a Tx PDCP layer apparatus 4g-01 of the UE for which UDC is configured may receive upper layer data (4g-05) and determine whether to apply UDC (4g-10). Herein, the PDCP layer apparatus 4g-01 may determine whether to apply UDC, by receiving instruction information for each IP or QoS flow from a SDAP layer apparatus, or the PDCP layer apparatus 4g-01 or a UDC apparatus may determine whether to apply UDC to each IP or QoS flow, based on configuration information included in a RRC message provided by a gNB.

When UDC is not applied to the upper layer data, a U field of a PDCP header may be set to be 0 (or 1) and a UDC header may be omitted (4g-20). When UDC is applied to the upper layer data, the U field of the PDCP header may be set to be 1 (or 0) and a UDC header may be configured and inserted (4g-15).

Figure 4H:
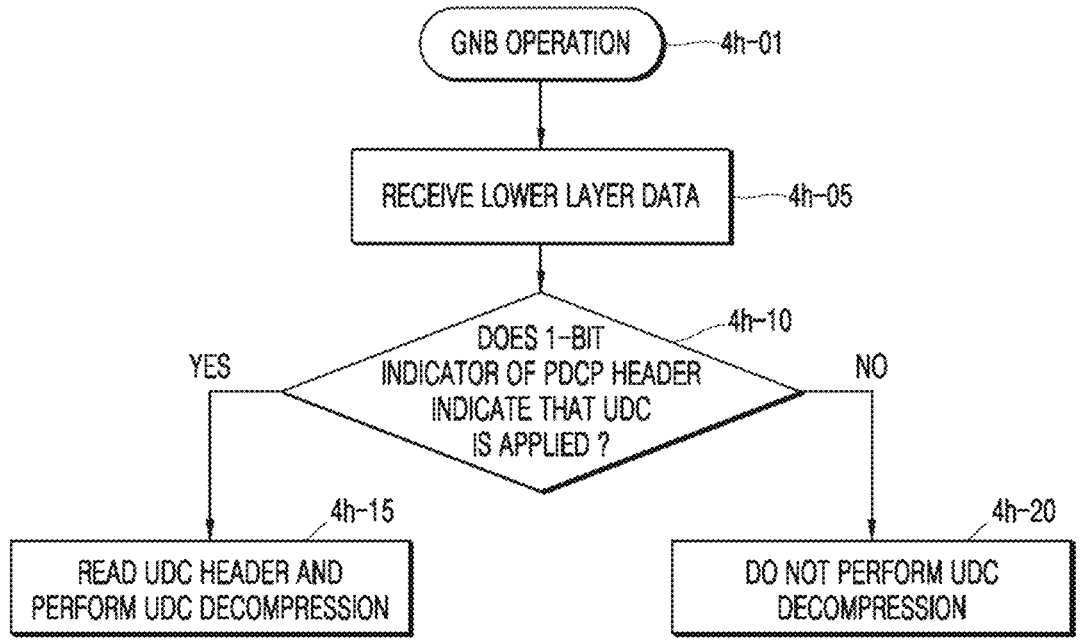
FIG. 4H is a flowchart illustrating a receiver (gNB) operation for performing a UDC method capable of reducing overhead, according to an embodiment.

FIG. 4H is a flowchart illustrating a receiver (gNB) operation for performing a UDC method capable of reducing overhead, according to an embodiment.

In FIG. 4H, when lower layer data is received (4h-05), a Rx PDCP layer apparatus 4h-01 of the gNB may determine whether UDC is applied, by using a 1-bit indicator of a PDCP header (4h-10). When a U field of the PDCP header is set to be 0, the Rx PDCP layer apparatus of the gNB may determine that no UDC header exists, and omit a UDC process, i.e., uplink data decompression, on a PDCP SDU (4h-20).

Otherwise, when the U field of the PDCP header is set to be 1, the Rx PDCP layer apparatus of the gNB may determine that a UDC header exists, read the UDC header of the PDCP SDU, check validity of a buffer by using checksum bits of the UDC header, and perform uplink data decompression on the other part of the PDCP SDU to reconstruct raw data (4h-15).

Using the 1-bit indicator of the PDCP header according to an embodiment, data to which UDC is applied by a transmitter and data to which UDC is not applied may be independently processed. For example, independent PDCP sequence numbers may be assigned to the data to which UDC is applied and the data to which UDC is not applied. That is, using the 1-bit indicator of the PDCP header, the receiver may operate independent Rx windows of the PDCP layer apparatus, independent window variables, and independent timers for the data to which UDC is applied and the data to which UDC is not applied.

Alternatively, common PDCP sequence numbers may be assigned to the data to which UDC is applied and the data to which UDC is not applied, and a receiver may distinguish between the data to which UDC is applied and the data to which UDC is not applied, by using a 1-bit indicator of a header (e.g., a PDCP header or a UDC header) to independently process the data, and deliver the independently processed data to an upper layer in order of being processed. In this case, the receiver may deliver the data to which UDC is applied, to the upper layer in ascending order of the PDCP sequence numbers, and deliver the data to which UDC is not applied, to the upper layer in ascending order of the PDCP sequence numbers.

That is, when the Rx PDCP layer of the receiver delivers data to the upper layer, the Rx PDCP layer does not merely deliver the data in ascending order of PDCP sequence numbers and may distinguish between data to which UDC is applied and data to which UDC is not applied, deliver the data to which UDC is applied, to the upper layer in ascending order of PDCP sequence numbers, and deliver the data to which UDC is not applied, to the upper layer in ascending order of PDCP sequence numbers.

Figure 4I:
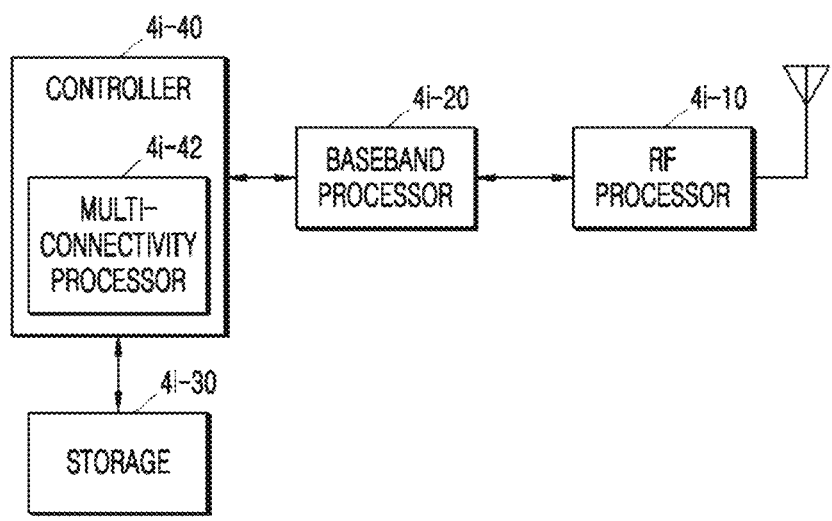
FIG. 4I illustrates a block diagram of a UE according to an embodiment.

FIG. 4I illustrates a block diagram of a UE according to an embodiment.

Referring to FIG. 4I, the UE may include a radio frequency (RF) processor 4i-10, a baseband processor 4i-20, a storage 4i-30, and a controller 4i-40. The above-mentioned elements are merely examples and elements of the UE are not limited thereto.

The RF processor 4i-10 may perform functions for transmitting and receiving signals through radio channels, e.g., band conversion and amplification of signals. The RF processor 4i-10 may up-convert a baseband signal provided from the baseband processor 4i-20, into a RF band signal and then transmit the RF band signal through an antenna, and down-convert an RF band signal received through an antenna, into a baseband signal. For example, the RF processor 4i-10 may include a Tx filter, a Rx filter, an amplifier, a mixer, an oscillator, a digital-to-analog convertor (DAC), and an analog-to-digital convertor (ADC). Although only a single antenna is illustrated in FIG. 4I, the UE may include multiple antennas. The RF processor 4i-10 may include multiple RF chains. The RF processor 4i-10 may perform beamforming. For beamforming, the RF processor 4i-10 may adjust phases and sizes of signals transmitted or received through multiple antennas or antenna elements. The RF processor 4i-10 may perform MIMO and may receive data of multiple layers in the MIMO operation. The RF processor 4i-10 may perform Rx beam sweeping by appropriately configuring multiple antennas or antenna elements, or adjust a direction and a beam width of the Rx beam to coordinate with the Tx beam, under the control of the controller 4i-40.

The baseband processor 4i-20 may convert between a baseband signal and a bitstream based on physical layer specifications of a system. For example, for data transmission, the baseband processor 4i-20 may generate complex symbols by encoding and modulating a Tx bitstream. For data reception, the baseband processor 4i-20 may reconstruct a Rx bitstream by demodulating and decoding a baseband signal provided from the RF processor 4i-10. For example, according to an orthogonal frequency-division multiplexing (OFDM) scheme, for data transmission, the baseband processor 4i-20 may generate complex symbols by encoding and modulating a Tx bitstream, map the complex symbols to subcarriers, and then configure OFDM symbols by performing inverse fast Fourier transformation (IFFT) and inserting a cyclic prefix (CP). For data reception, the baseband processor 4i-20 may segment a baseband signal provided from the RF processor 4i-10, into OFDM symbol units, reconstruct signals mapped to subcarriers by performing fast Fourier transformation (FFT), and then reconstruct a Rx bitstream by demodulating and decoding the signals.

The baseband processor 4i-20 and the RF processor 4i-10 may transmit and receive signals as described above. As such, the baseband processor 4i-20 and the RF processor 4i-10 may also be called transmitters, receivers, transceivers, or communication units. At least one of the baseband processor 4i-20 and the RF processor 4i-10 may include multiple communication modules to support different multiple radio access technologies. At least one of the baseband processor 4i-20 and the RF processor 4i-10 may include multiple communication modules to process signals of different frequency bands. For example, the different radio access technologies may include an LTE network and a NR network. The different frequency bands may include a super-high frequency (SHF) (e.g., 2.5 GHz or 5 Ghz) band and a millimeter wave (mmWave) (e.g., 60 GHz) band.

The storage 4i-30 may store data such as basic programs, application programs, and configuration information for the above-described operations of the UE. The storage 4i-30 may provide the stored data upon request by the controller 4i-40.

The controller 4i-40 may control overall operations of the UE. For example, the controller 4i-40 may transmit and receive signals through the baseband processor 4i-20 and the RF processor 4i-10. The controller 4i-40 may record and read data on or from the storage 4i-30. In this regard, the controller 4i-40 may include at least one processor. For example, the controller 4i-40 may include a communication processor (CP) for controlling communications and an application processor (AP) for controlling an upper layer such as an application program.

The controller 4i-40 may include a multi-connectivity processor 4i-42 for operation in a multi-connectivity mode. For example, the controller 4i-40 may control the UE to perform a UE operation according to the afore-described embodiment.

According to an embodiment of the present disclosure, the UE may receive DRB setup information and scheduling request (SR) transmission configuration information from a gNB, request scheduling by transmitting a SR according to the afore-described embodiment, and transmit data by receiving allocation of uplink resources from the gNB.

Figure 4J:
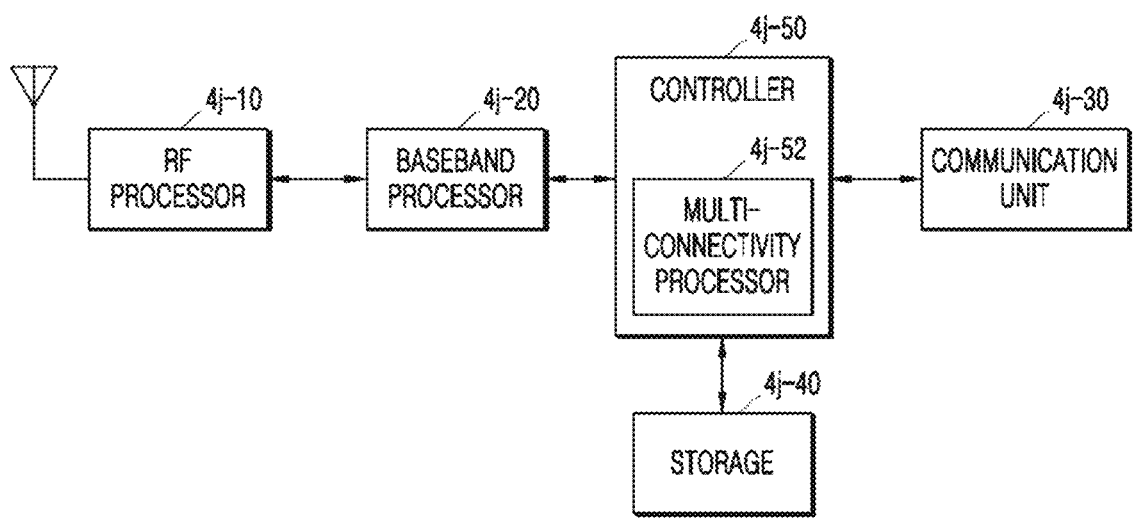
FIG. 4J illustrates a block diagram of a gNB according to an embodiment.

FIG. 4J illustrates a block diagram of a gNB according to an embodiment.

Referring to FIG. 4J, the gNB may include a RF processor 4j-10, a baseband processor 4j-20, a backhaul communication unit 4j-30, a storage 4j-40, and a controller 4j-50. The above-mentioned elements are merely examples and elements of the gNB are not limited thereto.

The RF processor 4j-10 may perform functions for transmitting and receiving signals through radio channels, e.g., band conversion and amplification of signals. The RF processor 4j-10 may up-convert a baseband signal provided from the baseband processor 4j-20, into a RF band signal and then transmit the RF band signal through an antenna, and down-convert an RF band signal received through an antenna, into a baseband signal. For example, the RF processor 4j-10 may include a Tx filter, a Rx filter, an amplifier, a mixer, an oscillator, a DAC, and an ADC. Although only a single antenna is illustrated in FIG. 4J, the gNB may include multiple antennas. The RF processor 4j-10 may include multiple RF chains. The RF processor 4j-10 may perform beamforming. For beamforming, the RF processor 4j-10 may adjust phases and sizes of signals transmitted or received through multiple antennas or antenna elements. The RF processor 4j-10 may perform downlink MIMO by transmitting data of one or more layers.

The baseband processor 4j-20 may convert between a baseband signal and a bitstream based on physical layer specifications of a wireless communication system. For example, for data transmission, the baseband processor 4j-20 may generate complex symbols by encoding and modulating a Tx bitstream. For data reception, the baseband processor 4j-20 may reconstruct a Rx bitstream by demodulating and decoding a baseband signal provided from the RF processor 4j-10. For example, according to an OFDM scheme, for data transmission, the baseband processor 4j-20 may generate complex symbols by encoding and modulating a Tx bitstream, map the complex symbols to subcarriers, and then configure OFDM symbols by performing IFFT and inserting a CP. For data reception, the baseband processor 4j-20 may segment a baseband signal provided from the RF processor 4j-10, into OFDM symbol units, reconstruct signals mapped to subcarriers by performing FFT, and then reconstruct a Rx bitstream by demodulating and decoding the signals. The baseband processor 4j-20 and the RF processor 4j-10 may transmit and receive signals as described above. As such, the baseband processor 4j-20 and the RF processor 4j-10 may also be called transmitters, receivers, transceivers, communication units, or wireless communication units.

The backhaul communication unit 4j-30 may provide an interface for communicating with other nodes in a network. The backhaul communication unit 4j-30 may transform a bitstream to be transmitted from the gNB to another node, e.g., a secondary node B or a core network, into a physical signal, or transform a physical signal received from another node, into a bitstream.

The storage 4j-40 may store data such as basic programs, application programs, and configuration information for operations of the gNB. Specifically, the storage 4j-40 may store information about bearers configured for a connected UE, a measurement report transmitted from the connected UE, etc. The storage 4j-40 may store criteria information used to determine whether to provide or release multi-connectivity to or from the UE. The storage 4j-40 may provide the stored data upon request by the controller 4j-50.

The controller 4j-50 may control overall operations of the gNB. For example, the controller 4j-50 may transmit and receive signals through the baseband processor 4j-20, the RF processor 4j-10, and the backhaul communication unit 4j-30. The controller 4j-50 may record and read data on or from the storage 4j-40. In this regard, the controller 4j-50 may include at least one processor. The controller 4j-50 may include a multi-connectivity processor 4j-52 for operation in a multi-connectivity mode.

Figure 5:
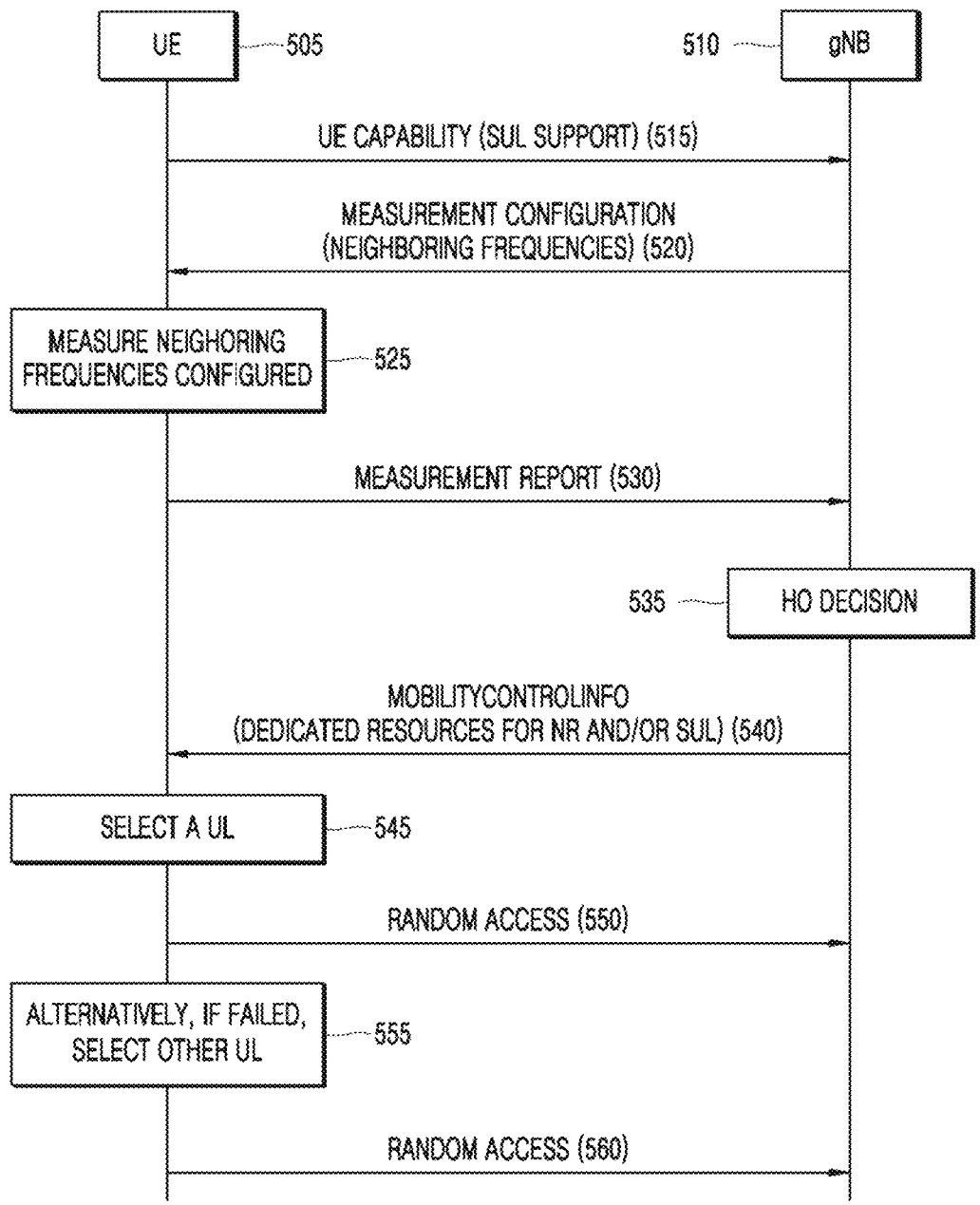
FIG. 5 is a flowchart illustrating a handover procedure according to an embodiment.

FIG. 5 is a flowchart illustrating a handover procedure according to an embodiment.

Referring to FIG. 5, a UE 505 reports to a gNB 510 that the UE 505 supports SUL (515). Information indicating whether the UE 505 supports SUL and information about a supported SUL frequency band are transmitted as SUL capability information. The gNB 510 may activate at least one of a NR uplink and a SUL for the UE 505. The UE 505 achieves uplink synchronization by performing random access through the activated uplink. The gNB 510 provides PUCCH configuration information for one uplink by using a radio resource control (RRC) signal. For scheduling, the gNB 510 provides downlink control information (DCI) indicating for which uplink a UL grant is given.

The gNB 510 provides, to the UE 505, configuration information instructing to measure neighboring frequencies or cells. That is, the gNB 510 transmits measurement configuration information to the UE 505 (520). The UE 505 measures the neighboring frequencies or cells based on the measurement configuration information (525). The UE 505 transmits a measurement report to the gNB 510 (530). The gNB 510 decides whether to perform handover (HO) for the UE 505, based on the measurement report (535).

The UE 505 receives handover configuration information from the gNB 510 (540). The handover configuration information includes mobility control information. The handover configuration information includes at least one of NR uplink and SUL configuration information of a target cell and random access radio resource information to be applied by the target cell.

The NR uplink and SUL configuration information of the target cell includes information about a center frequency and a bandwidth of a NR uplink frequency band of the target cell, and a center frequency and a bandwidth of a SUL frequency band of the target cell. Specifically, the center frequency may be a center frequency of a cell-defining SSB.

In the present disclosure, the random access radio resource information is provided by at least one of the NR uplink and the SUL. When a source gNB decides handover for a certain UE, the source gNB transmits a handover preparation request message to the target cell. The handover preparation request message includes the SUL capability information of the UE 505. For example, the SUL capability information includes information indicating whether the UE 505 supports SUL and information about a supported SUL frequency band.

The target cell transmits random access configuration information to be applied by the target cell, to the source gNB. When the random access configuration information corresponds to the SUL, the target cell transmits the random access configuration information to the source gNB.

In addition, when the random access radio resource information applied to the SUL of the target cell is provided, the target cell provides information indicating that the random access radio resource information is dedicated to the SUL. The random access radio resource information may include ID information of a preamble, time and frequency information used to transmit the preamble, and Tx power information of the preamble.

The UE 505 selects one uplink for attempting random access, according to a certain rule (545). For example, according to the certain rule, the NR uplink may always be selected first, or the SUL may be selected when a reference signal received power (RSRP) of the target cell is lower than a preset threshold value. The threshold value is provided to the UE 505 by using a RRC signal. For example, the threshold value may be included in the handover configuration information transmitted to the UE 505.

Alternatively, when the configuration information is provided for the two uplinks, the NR uplink and the SUL, the gNB 510 may also provide information indicating which of the NR uplink and the SUL is used first. The UE 505 performs random access to the target cell (550). When the random access ultimately fails (555), the UE 505 attempts random access again by using radio resources of the other uplink (560).

As another example, the UE 505 selects an uplink for attempting preamble transmission, based on the RSRP. When, the RSRP is lower than the preset threshold value, the UE 505 selects the SUL. Otherwise, the UE 505 selects the NR uplink. The threshold value is provided to the UE 505 by using system information or a dedicated RRC signal.

Figure 6:
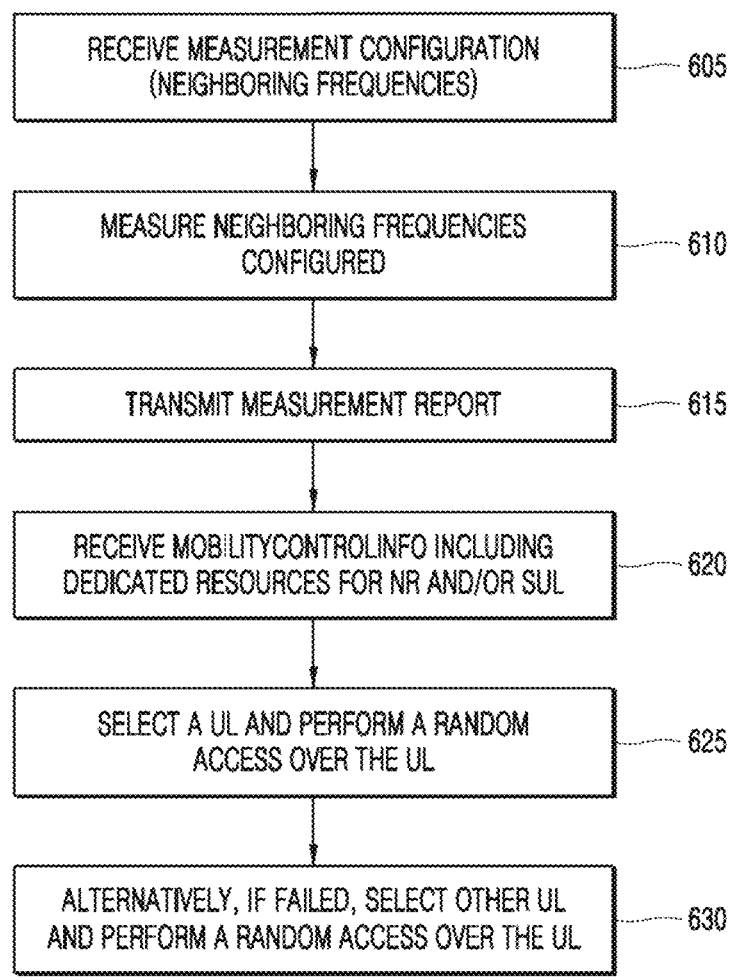
FIG. 6 is a flowchart illustrating a UE operation for performing handover, according to an embodiment.

FIG. 6 is a flowchart illustrating a UE operation for performing handover, according to an embodiment.

Referring to FIG. 6, in operation 605, a UE receives, from a gNB, configuration information instructing to measure neighboring frequencies or cells. In operation 610, the UE measures the neighboring frequencies or cells based on the measurement configuration. In operation 615, the UE transmits a measurement report to the gNB.

In operation 620, the UE receives handover configuration information from the gNB. In operation 625, the UE selects one of uplinks of a target cell and performs random access through the uplink. In operation 630, when the random access ultimately fails, the UE attempts random access again by using radio resources of the other uplink.

Figure 7:
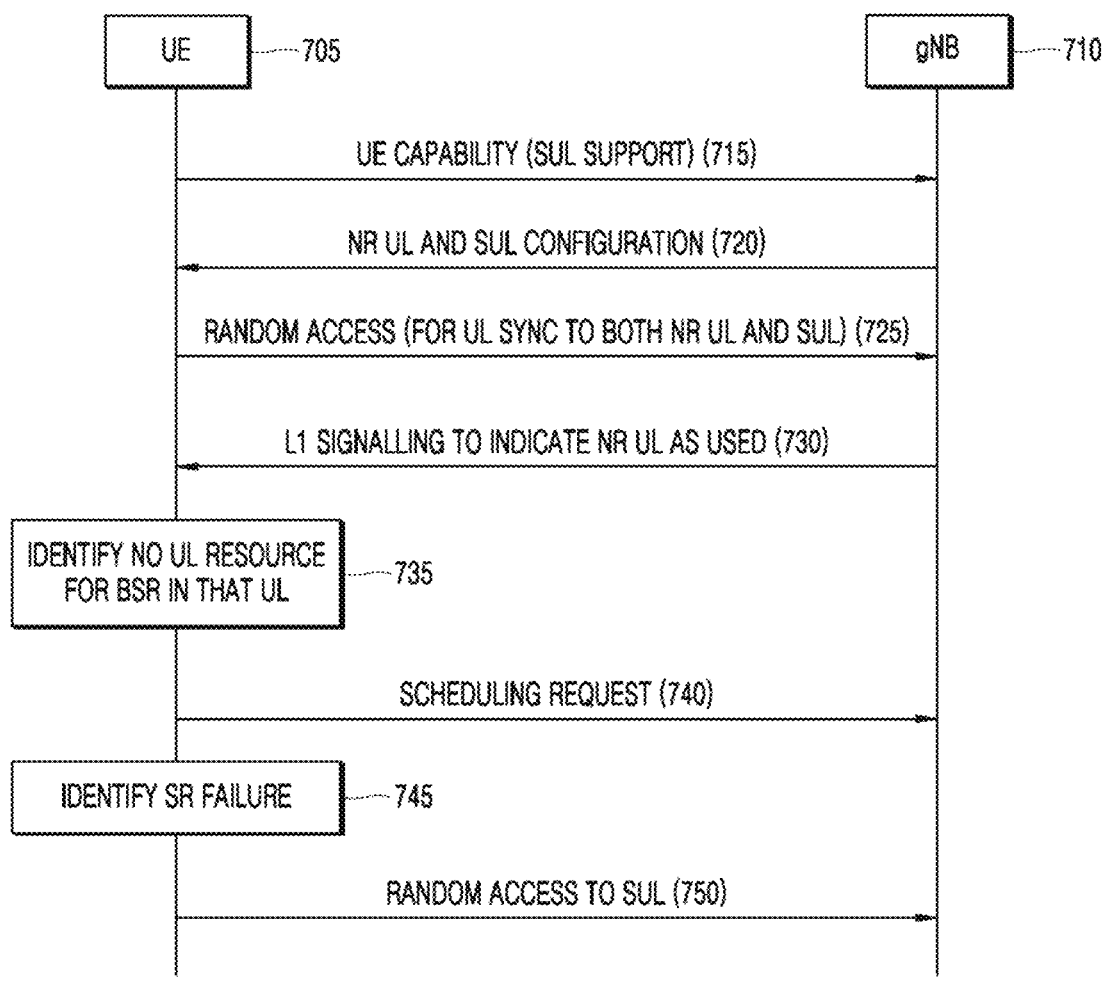
FIG. 7 is a flowchart illustrating a scheduling request procedure according to an embodiment.

FIG. 7 is a flowchart illustrating a scheduling request procedure according to an embodiment.

Referring to FIG. 7, a UE 705 reports, to a gNB 710, UE capability information indicating that the UE 705 supports SUL (715). Information indicating whether the UE 705 supports SUL and information about a supported SUL frequency band are transmitted as SUL capability information. The gNB 710 may activate a NR uplink, a SUL, or both for the UE 705. The UE 705 achieves uplink synchronization by performing random access through the activated uplink. The gNB 710 provides PUCCH configuration information for one uplink by using a RRC signal. For scheduling, the gNB 710 provides DCI indicating for which uplink a UL grant is given. The gNB 710 provides NR uplink and SUL configuration information to the UE 705 (720). The UE 705 performs random access to achieve uplink synchronization (725). The gNB 710 transmits a layer 1 (L1) signal indicating to use which of a NR uplink and a SUL for data transmission (730). The L1 signal corresponds to configuration information inserted by a physical layer and the configuration information is included in DCI of a PDCCH or a control resource set (CORESET). The L1 signal is decoded by a physical layer of a receiver, and thus is used when rapid transmission of information or an accurate application timing of received information is required.

For example, the gNB 710 configures the NR uplink for data transmission by using the L1 signal. The UE 705 identifies lack of uplink radio resources for a buffer status report (BSR) at a certain timing (735). The UE 705 transmits an SR to the gNB 710 to transmit the BSR (740). The UE 705 identifies transmission failure of the SR (745). The UE 705 switches to the SUL and performs random access to the gNB 710 (750).

As another example, the UE 705 selects an uplink for attempting SR transmission, based on a RSRP. The UE 705 selects the SUL when the RSRP is lower than a preset threshold value, and selects the NR uplink when the RSRP is equal to or higher than the preset threshold value. The threshold value is provided to the UE 705 by using system information or a dedicated RRC signal.

When transmission of the SR is attempted multiple times through the SUL but fails, the UE 705 triggers random access through an uplink determined based on a certain rule. For example, the SUL may be selected or an uplink for attempting preamble transmission is selected based on the RSRP. The UE 705 selects the SUL when the RSRP is lower than the preset threshold value, or selects the NR uplink otherwise. The threshold value is provided to the UE 705 by using system information or a dedicated RRC signal.

FIG. 8 is a flowchart illustrating a UE operation for requesting scheduling.

Referring to FIG. 8, in operation 805, a UE receives NR uplink and SUL configuration information from a gNB. In operation 810, the UE receives, from the gNB, an L1 signal indicating to use a NR uplink for data transmission. In operation 815, the UE transmits data through the indicated NR uplink.

In operation 820, the UE identifies lack of uplink radio resources for a BSR at a certain timing. In operation 825, the UE transmits an SR to the gNB to transmit the BSR. In operation 830, the UE identifies transmission failure of the SR. The UE switches to a SUL and performs random access to the gNB.

It should be understood that embodiments described herein should be considered in a descriptive sense only and not for purposes of limitation. Descriptions of features or aspects within each embodiment should typically be considered as available for other similar features or aspects in other embodiments. The afore-described embodiments may operate in combination when required. For example, a gNB (or eNB) and a UE may operate according to a combination of parts of the embodiments. Although the embodiments have been described on the basis of a NR system, modifications thereof based on the technical aspects of the embodiments are applicable to other systems such as frequency-division duplex (FDD) and time-division duplex (TDD) LTE systems.

According to the present disclosure, the performance of communications may be improved by solving a problem of unequal uplink and downlink service areas in a wireless communication system.

The present disclosure proposes a procedure for changing a bearer type from a split bearer using dual connectivity to a normal bearer (e.g., a master cell group (MCG) bearer or a secondary cell group (SCG) bearer) or releasing each SCG bearer using dual connectivity by independently releasing logical channels of the split bearer or the SCG bearer. As such, since the bearer type is freely changeable, signaling overhead due to configuration or reconfiguration of the bearer type may be reduced and transfer delay may be reduced.

The present disclosure also proposes a procedure for compressing or decompressing data when user equipment (UE) transmits uplink data or an evolved node B (eNB) or a next-generation node B (gNB) transmits downlink data to the UE in a wireless communication system. As such, since overhead is reduced, more data may be transmitted and coverage may be improved.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a terminal in a wireless communication system, the method comprising:
    receiving, from a base station, system information;
    if the terminal supports a supplementary uplink (SUL) frequency for a cell and if a SUL related cell selection parameter for the cell is included in the system information, obtaining the SUL related cell selection parameter included in the system information as $Q_{rxlevmin}$, wherein the $Q_{rxlevmin}$ is a minimum required reception (RX) level in the cell;
    if the terminal does not support the SUL frequency for the cell, obtaining a cell selection parameter included in the system information as the $Q_{rxlevmin}$; and
    performing a cell selection procedure for the cell based on a cell selection criterion,
    wherein the cell selection criterion includes a first inequality related to a cell selection reception (RX) level value and a second inequality related to a cell selection quality value, the first inequality being based on the $Q_{rxlevmin}$.

2. The method of claim 1, wherein the performing of the cell selection procedure for the cell comprises:
    determining the cell selection reception (RX) level value, based on the minimum required reception (RX) level value and a measured cell reception (RX) level value for the cell.

3. The method of claim 1, wherein the system information comprises remaining minimum system information (RMSI).

4. A terminal, comprising:
    a transceiver; and
    a processor coupled with the transceiver and configured to:
        receive, from a base station, system information;
        if the terminal supports a supplementary uplink (SUL) frequency for a cell and if a SUL related cell selection parameter for the cell is included in the system information, obtain the SUL related cell selection parameter included in the system information as $Q_{rxlevmin}$, wherein the $Q_{rxlevmin}$ is a minimum required reception (RX) level in the cell;
        if the terminal does not support the SUL frequency for the cell, obtain a cell selection parameter included in the system information as the $Q_{rxlevmin}$; and
        perform a cell selection procedure for the cell based on a cell selection criterion,
    wherein the cell selection criterion includes a first inequality related to a cell selection reception (RX) level value and a second inequality related to a cell selection quality value, the first inequality being based on the $Q_{rxlevmin}$.

5. The terminal of claim 4, wherein the performing of the cell selection procedure for the cell comprises:
    determining the cell selection reception (RX) level value, based on the minimum required reception (RX) level value and a measured cell reception (RX) level value for the cell.

6. The terminal of claim 4, wherein the system information comprises remaining minimum system information (RMSI).

7. A method performed by a base station in a wireless communication system, the method comprising:
    generating system information for a cell; and
    transmitting the system information, wherein, if a terminal supports a supplementary uplink (SUL) frequency for the cell and if a SUL related cell selection parameter for the cell is included in the system information, the SUL related cell selection parameter for the cell is used as $Q_{rxlevmin}$ for performing a cell selection procedure for the cell, wherein the $Q_{rxlevmin}$ is a minimum required reception (RX) level in the cell,
    wherein, if the terminal does not support the SUL frequency for the cell, a cell selection parameter included in the system information is used as the $Q_{rxlevmin}$ for performing the cell selection procedure for the cell,
    wherein the cell selection procedure for the cell is performed based on a cell selection criterion, and
    wherein the cell selection criterion includes a first inequality related to a cell selection reception (RX) level value and a second inequality related to a cell selection quality value, the first inequality being based on the $Q_{rxlevmin}$.

8. The method of claim 7, wherein the system information comprises remaining minimum system information (RMSI).

9. A base station in a wireless communication system, the base station comprising:
- a transceiver; and
- a processor coupled with the transceiver and configured to:
- generate system information for a cell; and
- transmit the system information, wherein, if a terminal supports a supplementary uplink (SUL) frequency for the cell and if a SUL related cell selection parameter for the cell is included in the system information, the SUL related cell selection parameter for the cell is used as $Q_{rxlevmin}$ for performing a cell selection procedure for the cell, wherein the $Q_{rxlevmin}$ is a minimum required reception (RX) level in the cell,
- wherein, if the terminal does not support the SUL frequency for the cell, a cell selection parameter included in the system information is used as the $Q_{rxlevmin}$ for performing the cell selection procedure for the cell,
- wherein the cell selection procedure for the cell is performed based on a cell selection criterion, and
- wherein the cell selection criterion includes a first inequality related to a cell selection reception (RX) level value and a second inequality related to a cell selection quality value, the first inequality being based on the $Q_{rxlevmin}$.

10. The base station of claim 9, wherein the system information comprises remaining minimum system information (RMSI).

* * * * *